United States Patent
Noguchi et al.

(10) Patent No.: US 9,354,745 B2
(45) Date of Patent: May 31, 2016

(54) TOUCH DETECTION DEVICE, DISPLAY DEVICE HAVING TOUCH DETECTION FUNCTION, ELECTRONIC UNIT, AND TOUCH DETECTION CIRCUIT

(71) Applicant: JAPAN DISPLAY WEST INC., Chita-Gun, Aichi-Ken (JP)

(72) Inventors: Koji Noguchi, Kanagawa (JP); Yoshitoshi Kida, Kanagawa (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 14/253,545

(22) Filed: Apr. 15, 2014

(65) Prior Publication Data

US 2014/0225866 A1    Aug. 14, 2014

Related U.S. Application Data

(63) Continuation of application No. 13/093,057, filed on Apr. 25, 2011, now Pat. No. 8,736,563.

(30) Foreign Application Priority Data

Apr. 30, 2010    (JP) .................................. 2010-105575

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01); *G06F 3/0412* (2013.01); *G06F 2203/04111* (2013.01)

(58) Field of Classification Search
CPC ...................................................... G06F 3/044
USPC .......... 345/173, 174; 178/18.01, 18.02, 18.06
See application file for complete search history.

(56) References Cited

U.S. PATENT DOCUMENTS

| | | | | |
|---|---|---|---|---|
| 5,374,787 A | * | 12/1994 | Miller et al. ................ | 178/18.06 |
| 2007/0001681 A1 | | 1/2007 | Sato | |
| 2007/0262969 A1 | * | 11/2007 | Pak ............................... | 345/173 |
| 2008/0062139 A1 | * | 3/2008 | Hotelling et al. ............. | 345/173 |
| 2008/0062140 A1 | * | 3/2008 | Hotelling et al. ............. | 345/173 |
| 2008/0062147 A1 | * | 3/2008 | Hotelling et al. ............. | 345/174 |

(Continued)

FOREIGN PATENT DOCUMENTS

| | | |
|---|---|---|
| JP | 11-143626 | 5/1999 |
| JP | 2005-190032 | 7/2005 |

(Continued)

OTHER PUBLICATIONS

Japanese Patent Office, Office Action issued in connection with Japanese Patent Application No. 2010-105575, dated Nov. 5, 2013. (2 pages).

*Primary Examiner* — Adam J Snyder
(74) *Attorney, Agent, or Firm* — K&L Gates LLP

(57) ABSTRACT

A touch detection device includes: a plurality of drive electrodes; a plurality of detection electrodes intersecting the plurality of drive electrodes, and each outputting, in response to driving of each of the drive electrodes, a series of detection signals; a signal correction section determining a reference based on the detection signals, and subtracting the determined reference from each of the detection signals; and a detecting section detecting an external proximity object based on corrected detection signals provided from the signal correction section.

10 Claims, 17 Drawing Sheets

(56) References Cited

U.S. PATENT DOCUMENTS

| | | | |
|---|---|---|---|
| 2008/0150901 A1* | 6/2008 | Lowles et al. | 345/173 |
| 2008/0158169 A1* | 7/2008 | O'Connor et al. | 345/173 |
| 2009/0256818 A1* | 10/2009 | Noguchi et al. | 345/174 |
| 2010/0066692 A1* | 3/2010 | Noguchi et al. | 345/173 |
| 2010/0085324 A1* | 4/2010 | Noguchi et al. | 345/174 |
| 2010/0110035 A1* | 5/2010 | Selker | G06F 3/044 345/174 |
| 2010/0182273 A1* | 7/2010 | Noguchi et al. | 345/174 |
| 2010/0231551 A1* | 9/2010 | Takano et al. | 345/174 |
| 2010/0231552 A1* | 9/2010 | Saito et al. | 345/174 |
| 2010/0238134 A1* | 9/2010 | Day et al. | 345/174 |

FOREIGN PATENT DOCUMENTS

| | | |
|---|---|---|
| JP | 2011-519458 | 7/2011 |
| WO | 2009/133559 | 11/2009 |

\* cited by examiner

TOUCH DETECTION DEVICE, DISPLAY DEVICE HAVING TOUCH DETECTION FUNCTION, ELECTRONIC UNIT, AND TOUCH DETECTION CIRCUIT

CROSS REFERENCES TO RELATED APPLICATIONS

The present application is a Continuation application of U.S. patent application Ser. No. 13/093,057 filed Apr. 25, 2011, which claims priority to Japanese Priority Patent Application JP 2010-105575 filed in the Japan Patent Office on Apr. 30, 2010, the entire content of which is hereby incorporated by reference.

BACKGROUND

The application relates to a touch detection device which detects an external proximity object such as a finger, to a display device having a touch detection function, to an electronic unit, and to a touch detection circuit used for those devices.

In recent years, attention has been drawn to a display device in which a contact detection device, generally referred to as a touch panel, is mounted on a display such as a liquid crystal display, or in which the touch panel and the display are integrated, and which allows the display to display various button images etc. to thereby make it possible to input information instead of providing typical mechanical buttons. The display device provided with the touch panel eliminates a necessity of providing an input device such as a keyboard, a mouse, and a keypad, and is thus being used more and more not only in a computer but also in a portable handheld terminal such as a cellular telephone.

There are a number of types of touch panels, including such as an optical type and a resistance type. In devices such as the portable handheld terminal, in particular, there are high expectations for a touch panel of an electrostatic capacitance type. The electrostatic capacitance type touch panel has a relatively simple configuration, and is capable of reducing power consumption. However, the electrostatic capacitance type touch panel is, in principle, susceptible to noise attributed to an inverter fluorescent lamp, an AM (amplitude modulation) wave, an AC (alternating current) power source, or other noise source (hereinafter referred to as an "external noise"). In particular, a detection sensitivity is likely to be decreased in detecting a proximal state or a "proximity" of an external proximity object, since a signal-to-noise (S/R) ratio deteriorates as compared with a case in which a contact state of the external proximity object is to be detected.

Various studies have been made with a view toward providing a method for improving a resistance to the external noise. For example, Japanese Unexamined Patent Application Publication No. 2007-13432 (JP2007-13432A) discloses a touch panel in which electrostatic sensors, dedicated for detecting the external noise, are provided around and provided separately from an input electrostatic sensor used for detecting the proximity or the contact of the external proximity object. The disclosed touch panel compares signals obtained from the noise-detecting electrostatic sensors and the input electrostatic sensor to separate a touch component from an external noise component. A surface of the noise-detecting electrostatic sensor is provided with a protection cover, so that the noise-detecting electrostatic sensor makes no response to the external proximity object even when the external proximity object is in contact thereto.

SUMMARY

However, the inventor/the inventors has/have found that, since an input electrostatic sensor and noise-detecting electrostatic sensors are provided separately from one another in a fixed fashion in a touch panel disclosed in JP2007-13432A, differences such as a difference in arrangement location of those electrostatic sensors, a difference in size of the electrostatic sensors, and a difference in a surrounding part such as with or without a protection cover, cause an external noise component inputted to the input electrostatic sensor and that inputted to the noise-detecting electrostatic sensor to be different from one another. This makes a calculation, performed in obtaining a touch component by subtracting the external noise component from the touch component, to be complex, which in turn makes a configuration of a touch detection circuit to be complex.

It is desirable to provide a touch detection device, a display device having a touch detection function, an electronic unit, and a touch detection circuit, capable of reducing an external noise component with a simple configuration.

A touch detection device according to an embodiment includes: a plurality of drive electrodes arranged side-by-side and extending in a direction; a plurality of detection electrodes arranged side-by-side, extending to intersect the drive electrodes, allowing an electrostatic capacitance to be formed at each of intersections of the drive electrodes and the detection electrodes, and each outputting a detection signal in response to driving of each of the drive electrodes; a signal correction section correcting the detection signals outputted from the detection electrodes, through determining a reference based on the detection signals, and through subtracting the determined reference from each of the detection signals; and a detecting section detecting an external proximity object based on corrected detection signals provided from the signal correction section.

A touch detection device according to another embodiment includes: a plurality of drive electrodes; a plurality of detection electrodes intersecting the plurality of drive electrodes, and each outputting, in response to driving of each of the drive electrodes, a series of detection signals; a signal correction section determining a reference based on the detection signals, and subtracting the determined reference from each of the detection signals; and a detecting section detecting an external proximity object based on corrected detection signals provided from the signal correction section.

A display device having a touch detection function according to an embodiment includes: a display section performing display based on an image signal; a plurality of drive electrodes arranged side-by-side and extending in a direction; a plurality of detection electrodes arranged side-by-side, extending to intersect the drive electrodes, allowing an electrostatic capacitance to be formed at each of intersections of the drive electrodes and the detection electrodes, and each outputting a detection signal in response to driving of each of the drive electrodes; a signal correction section correcting the detection signals outputted from the detection electrodes, through determining a reference based on the detection signals, and through subtracting the determined reference from each of the detection signals; and a detecting section detecting an external proximity object based on corrected detection signals provided from the signal correction section.

An electronic unit according to an embodiment includes: a touch detection device; and a control section performing an operation control that utilizes the touch detection device. The touch detection device includes: a plurality of drive electrodes arranged side-by-side and extending in a direction; a plurality of detection electrodes arranged side-by-side, extending to intersect the drive electrodes, allowing an electrostatic capacitance to be formed at each of intersections of the drive electrodes and the detection electrodes, and each outputting a detection signal in response to driving of each of the drive electrodes; a signal correction section correcting the detection signals outputted from the detection electrodes, through determining a reference based on the detection signals, and through subtracting the determined reference from each of the detection signals; and a detecting section detecting an external proximity object based on corrected detection signals provided from the signal correction section. As used herein, the term "electronic unit" refers to any devices in which a detection of a touch or a proximity of the external proximity object is desirable. The electronic unit includes, such as but not limited to, a television device, a digital camera, a computer including a desk-top personal computer and a laptop personal computer, a portable terminal device including a cellular phone, and a video camera.

A touch detection circuit according to an embodiment includes: a signal correction section correcting detection signals through determining a reference based on the detection signals and through subtracting the determined reference from each of the detection signals, the detection signals being outputted from detection electrodes, the detection electrodes being arranged side-by-side, extending to intersect drive electrodes arranged side-by-side and extending in a direction, allowing an electrostatic capacitance to be formed at each of intersections of the drive electrodes and the detection electrodes, and each outputting the detection signal in response to driving of each of the drive electrodes; and a detecting section detecting an external proximity object based on corrected detection signals provided from the signal correction section.

In the touch detection devices, the display device having the touch detection function, the electronic unit, and the touch detection circuit according to the embodiments, the detection signals corresponding to a proximity or a touch of the external proximity object are supplied to the signal correction section. Each of the detection signals includes a touch component in which amplitude becomes large in accordance with the proximity or the touch of the external proximity object. The detection signal may include a noise component in addition to the touch component. The signal correction section determines, based on the detection signals, the reference that hardly includes the touch component, and subtracts the reference from each of the detection signals, to thereby extract the touch component.

Advantageously, the signal correction section calculates, for each of the detection electrodes, a time-average of absolute value of a sum of a touch component and a noise component both contained in the detection signal outputted from the corresponding detection electrode, selects a smallest time-average from the plurality of time-averages obtained, and uses, as the reference, a time-average of a detection signal which has brought the selected smallest time-average. Alternatively, the signal correction section calculates, for each of the detection electrodes, a time-average of a variation component in the detection signal outputted from the corresponding detection electrode, selects a smallest time-average from the plurality of time-averages obtained, and uses, as the reference, a time-average of a detection signal which has brought the selected smallest time-average.

Advantageously, the signal correction section determines, for each of the detection electrodes, a minimum of absolute value of a sum of a touch component and a noise component both contained in the detection signal outputted from the corresponding detection electrode, selects a smallest minimum from the plurality of minimums obtained, and uses, as the reference, a detection signal which has brought the smallest minimum. Alternatively, the signal correction section determines, for each of the detection electrodes, a minimum of absolute value of a variation component in the detection signal outputted from the corresponding detection electrode, selects a smallest minimum from the plurality of minimums obtained, and uses, as the reference, a detection signal which has brought the smallest minimum.

Advantageously, the signal correction section subtracts the current reference from each of the current detection signals. The current reference is determined from the current detection frame, and the current detection signals are obtained from the respective detection electrodes in the current detection frame.

Advantageously, the signal correction section temporarily holds the current detection signals obtained from the respective the detection electrodes.

Advantageously, the signal correction section subtracts the preceding reference from each of the current detection signals. The preceding reference is determined from the preceding detection frame, and the current detection signals are obtained from the respective detection electrodes in the current detection frame.

According to the touch detection devices, the display device having the touch detection function, the electronic unit, and the touch detection circuit of the embodiments, the reference is determined based on the detection signals, and the reference is subtracted from each of the detection signals. Therefore, it is possible to reduce the external noise component with a simple configuration.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Embodiments of the present application will be described below in detail with reference to the drawings.

1. Basic Principle of Electrostatic Capacitance Type Touch Detection
2. First Embodiment
3. Second Embodiment
4. Application Examples

1. BASIC PRINCIPLE OF ELECTROSTATIC CAPACITANCE TYPE TOUCH DETECTION

First, with reference to FIGS. 1 to 3, a basic principle of a touch detection in a display device having a touch detection function according to embodiments will be described. This touch detection scheme is embodied as an electrostatic capacitance type touch sensor. For example, as illustrated in (A) of FIG. 1, a pair of electrodes (a drive electrode E1 and a touch detection electrode E2), which are disposed to face each other with a dielectric D interposed in between, are used to configure a capacitor element C1. This configuration is representable as an equivalent circuit illustrated in (B) of FIG. 1. The capacitor element C1 is configured by the drive electrode E1, the detection electrode E2, and the dielectric D. The capacitor element C1 has a first end connected to an AC signal source (a drive signal source) S, and a second end P grounded through a resistor R and connected to a voltage detector (a touch detection circuit) DET. When an AC rectangular wave Sg ((B) of FIG. 3) having a predetermined frequency (for example, approximately several kHz to ten-odd kHz) is applied from the AC signal source S to the drive electrode E1 (the first end of the capacitor element C1), an output waveform (a touch detection signal Vdet) illustrated in (A) of FIG. 3 appears in the detection electrode E2 (the second end P of the capacitor element C1). This AC rectangular wave Sg is equivalent to a drive signal Vcom, which will be described later.

Figure 1:
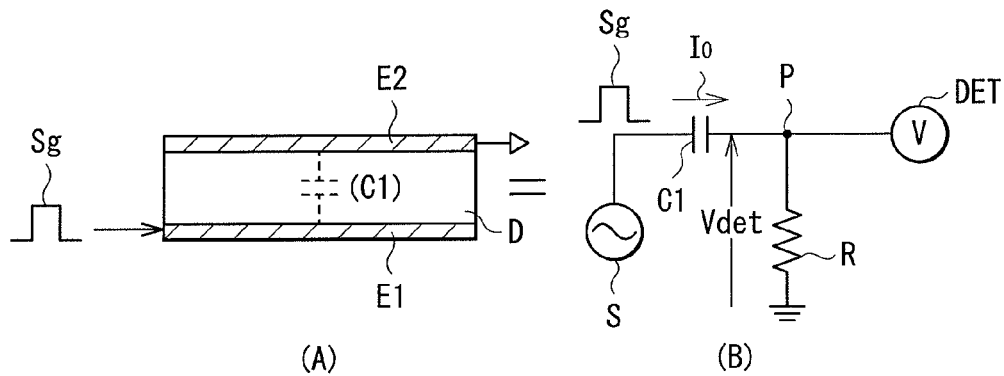
FIG. 1 is an explanatory diagram for describing a basic principle of a touch detection scheme in a display device having a touch detection function according to embodiments of the application, and illustrates a case where an external proximity object such as a finger is not in a contact state nor is in a proximity state.

As illustrated in FIG. 1, in a case where an external proximity object (such as a finger in the exemplary embodiments, although a member such as a pen may be used) is not in a contact state nor is in a proximity state, a current I0 corresponding to a capacitance value of the capacitor element C1 flows in accordance with charge/discharge performed on the capacitor element C1. An electric potential waveform of the second end P in the capacitor element C1 at this time is, for example, as illustrated by a waveform V0 in (A) of FIG. 3, which is detected by the voltage detector DET.

Figure 2:
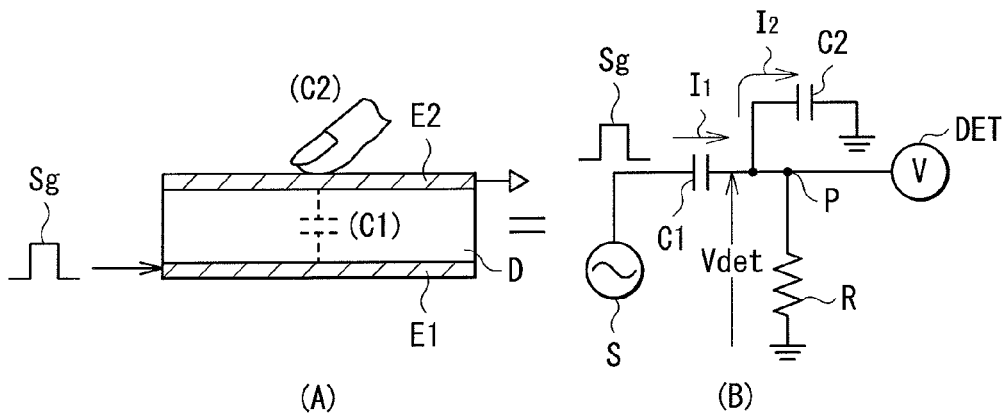
FIG. 2 is an explanatory diagram for describing the basic principle of the touch detection scheme in the display device having the touch detection function according to the embodiments, and illustrates a case where the finger is in the contact state or is in the proximity state.
Figure 3:
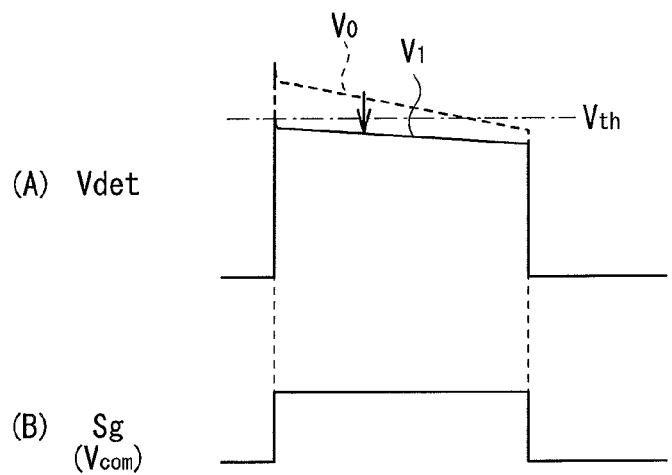
FIG. 3 is an explanatory diagram for describing the basic principle of the touch detection scheme in the display device having the touch detection function according to the embodiments, and illustrates an example of a waveform of a drive signal and an example of a waveform of a touch detection signal.

On the other hand, in a case where the finger is in the contact state or is in the proximity state, a capacitor element C2 formed by the finger is added in series to the capacitor element C1, as illustrated in FIG. 2. In this state, when charge/discharge is performed on the capacitor elements C1 and C2, currents I1 and I2 flow, respectively. The electric potential waveform of the second end P in the capacitor element C1 at this time is, for example, as illustrated by a waveform V1 in (A) of FIG. 3, which is detected by the voltage detector DET. Herein, an electric potential at the second end P is a divided electric potential determined by values of the currents I1 and I2 flowing through the capacitor elements C1 and C2, respectively. Hence, the waveform V1 is smaller in value than the waveform V0 derived from the non-contact state or from the non-proximity state. The voltage detector DET compares the detected voltage with a predetermined threshold voltage Vth. The voltage detector DET determines that the finger is in the non-contact state or is in the non-proximity state when the detected voltage is equal to or larger than the threshold voltage Vth, whereas, the detector DET determines that the finger is in the contact state or is in the proximity state when the detected voltage is smaller than the threshold voltage Vth, thereby making it possible to perform the touch detection.

2. FIRST EMBODIMENT

Configuration Example

Overall Configuration

Figure 4:
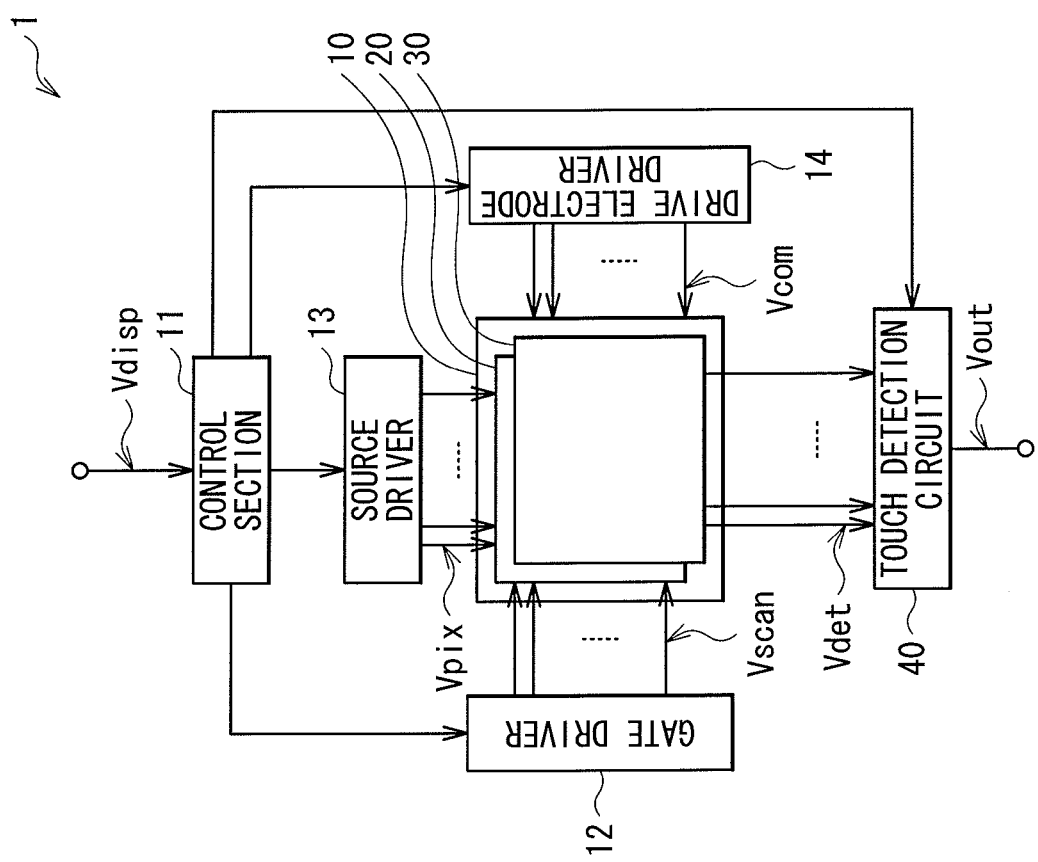
FIG. 4 is a block diagram illustrating a configuration example of a display device having a touch detection function according to a first embodiment.

FIG. 4 illustrates a configuration example of a display device having a touch detection function according to a first embodiment. It is to be noted that this embodiment is applicable to and embodies a touch detection device and a touch detection circuit according to embodiments of the application as well. Hence, description on the touch detection device and the touch detection circuit will be given collectively in conjunction with this embodiment. The display device having the touch detection function according to this embodiment is a device of a so-called "in-cell" type, in which a liquid crystal display element is used as a display element, and in which a liquid crystal display unit, configured by the liquid crystal display element, and a touch detection unit of an electrostatic capacitance type are integrated.

The display device having the touch detection function 1 is provided with a control section 11, a gate driver 12, a source driver 13, a drive electrode driver 14, a display unit having a touch detection function (hereinafter simply referred to as a "touch detection function display unit") 10, and a touch detection circuit 40.

The control section 11 supplies, based on a picture signal Vdisp supplied from the outside, a control signal to each of the gate driver 12, the source driver 13, the drive electrode driver 14, and the touch detection circuit 40, and controls the gate driver 12, the source driver 13, the drive electrode driver 14, and the touch detection circuit 40 so that they operate in a mutually-synchronized fashion.

The gate driver 12 serves to sequentially select, based on the control signal supplied from the control section 11, a display horizontal line (one display horizontal line) subjected to a display drive performed by the touch detection function display unit 10. As will be described later in greater detail, the gate driver 12 applies a scan signal Vscan through a scan signal line GCL to a gate of a TFT (thin-film transistor) element Tr in a pixel Pix. Thereby, the gate driver 12 sequentially selects a row (i.e., one display horizontal line) among the pixels Pix, which are formed in matrix in a liquid crystal display unit 20 of the touch detection function display unit 10, as the row of the pixels Pix subjected to the display drive.

The source driver 13 supplies, based on the control signal supplied from the control section 11, a pixel signal Vpix to each of the later-described pixels Pix in the touch detection function display unit 10. As will be described later in greater detail, the source driver 13 supplies the pixel signal Vpix through a pixel signal line SGL to each of the pixels Pix structuring one display horizontal line which is sequentially selected by the gate driver 12. Those pixels Pix that are supplied with the pixel signals Vpix perform, in accordance with the supplied pixels signals Vpix, display of the one display horizontal line.

The drive electrode driver 14 supplies, based on the control signal supplied from the control section 11, the drive signals Vcom to later-described drive electrodes COML in the touch detection function display unit 10. The drive electrode driver 14 applies display drive signals, serving as the drive signals Vcom, to all of the drive electrodes COML in the touch detection function display unit 10 during a period in which the touch detection function display unit 10 performs the display (i.e., a display period). On the other hand, during a period of performing the touch detection (i.e., a touch detection period), the drive electrode driver 14 sequentially applies pulsed touch drive signals, serving as the drive signals Vcom, to the drive electrodes COML in the touch detection function display unit 10, to thereby sequentially select a detection horizontal line (one detection horizontal line) subjected to the touch detection performed by a touch detection unit 30. The touch detection unit 30 then outputs, per one detection horizontal line, the touch detection signals Vdet from a later-described plurality of touch detection electrodes TDL, and supplies those touch detection signals Vdet to the touch detection circuit 40. In the display period according to this embodiment, the drive signal Vcom (the display drive signal) is a direct current signal having a voltage of zero volts, and the pixels signals Vpix in the mutually-adjacent pixels Pix are reversed in polarity from each other. In other words, in this embodiment, the liquid crystal display unit 20 is driven based on a so-called dot-inversion driving scheme.

The touch detection function display unit 10 is a display unit which includes the touch detection function therein. The touch detection function display unit 10 is provided with the liquid crystal display unit 20 and the touch detection unit 30. The liquid crystal display unit 20 sequentially scans, in accordance with a gate signal supplied from the gate driver 12, one display horizontal line at a time to perform the display, as will be described later. The touch detection unit 30 operates based on the basic principle of the electrostatic capacitance type touch detection described above, and outputs the touch detection signals Vdet. The touch detection unit 30 sequentially scans, in accordance with the drive electrode driver 14, one detection horizontal line at a time to perform the touch detection.

The touch detection circuit 40 detects a presence of touch or proximity with respect to the touch detection unit 30, based on the control signal supplied from the control section 11 and on the touch detection signals Vdet supplied from the touch detection unit 30 of the touch detection function display unit 10. The touch detection circuit 40, when there is the presence of touch or proximity, obtains a coordinate of the detected touch or the detected proximity in a touch detection region.

Touch Detection Function Display Unit 10

A configuration example of the touch detection function display unit 10 will now be described in more detail.

Figure 5:
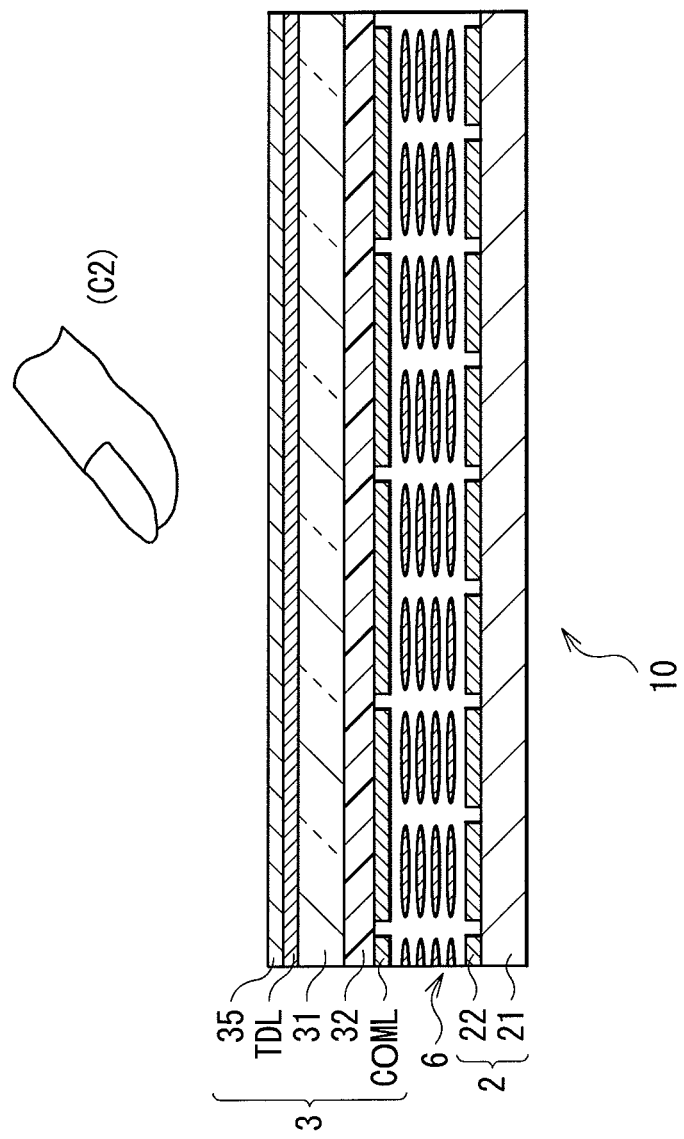
FIG. 5 is a cross-sectional view illustrating a schematic cross-sectional configuration of a touch detection function display unit illustrated in FIG. 4.

FIG. 5 illustrates an example of a schematic cross-sectional configuration of the touch detection function display unit 10. The touch detection function display unit 10 includes a pixel substrate 2, an opposed substrate 3 disposed to face the pixel substrate 2, and a liquid crystal layer 6 inserted between the pixel substrate 2 and the opposed substrate 3.

The pixel substrate 2 includes a TFT substrate 21 serving as a circuit substrate, and a plurality of pixel electrodes 22 disposed in matrix on the TFT substrate 21. The TFT substrate 21 is formed with TFTs for the respective pixels, and wirings such as the pixels signal lines SGL for supplying the image signals Vpix to the respective pixel electrodes 22 and the scan signal lines GCL for driving the respective TFTs, which are not illustrated in FIG. 5.

The opposed substrate 3 includes a glass substrate 31, a color filter 32 formed on a first surface of the glass substrate 31, and the plurality of drive electrodes COML formed on the color filter 42. The color filter 42 has a configuration in which, for example, color filter layers of three colors of red (R), green (G), and blue (B) are periodically aligned. Herein, a set of three colors of R, G and B is assigned to each display pixel, although the number of colors and the types of colors are not limited thereto. The drive electrode COML serves as a common drive electrode of the liquid crystal display unit 20, and also serves as a drive electrode of the touch detection unit 30. The drive electrode COML is coupled to the TFT substrate 21 by an unillustrated contact conductive pillar 7. The drive signal Vcom having an AC rectangular waveform is applied from the TFT substrate 21 through the contact conductive pillar 7 to the drive electrode COML. As illustrated in FIG. 5, each of the drive electrodes COML is provided to correspond to two pixels electrodes 22, although it is not limited thereto. In one embodiment, the drive electrode COML may be arranged to correspond to one pixel electrode 22, or may be arranged to correspond to three or more pixel electrodes 22. A second surface of the glass substrate 31 is formed with the touch detection electrodes TDL serving as detection electrodes of the touch detection unit 30, on which touch detection electrodes TDL a polarizing plate 35 is disposed.

The liquid crystal layer 6 modulates light passing therethrough in response to a state of an electric field, and is configured of a liquid crystal in any of various modes such as a TN (Twisted Nematic) mode, a VA (Vertical Alignment) mode, and an ECB (Electrically-Controlled Birefringence) mode.

Alignment films are respectively disposed between the liquid crystal layer 6 and the pixel substrate 2 and between the liquid crystal layer 6 and the opposed substrate 3, and a light-incident side polarizing plate is disposed below the pixel substrate 2, illustrations of which are omitted in the drawings.

Figure 6:
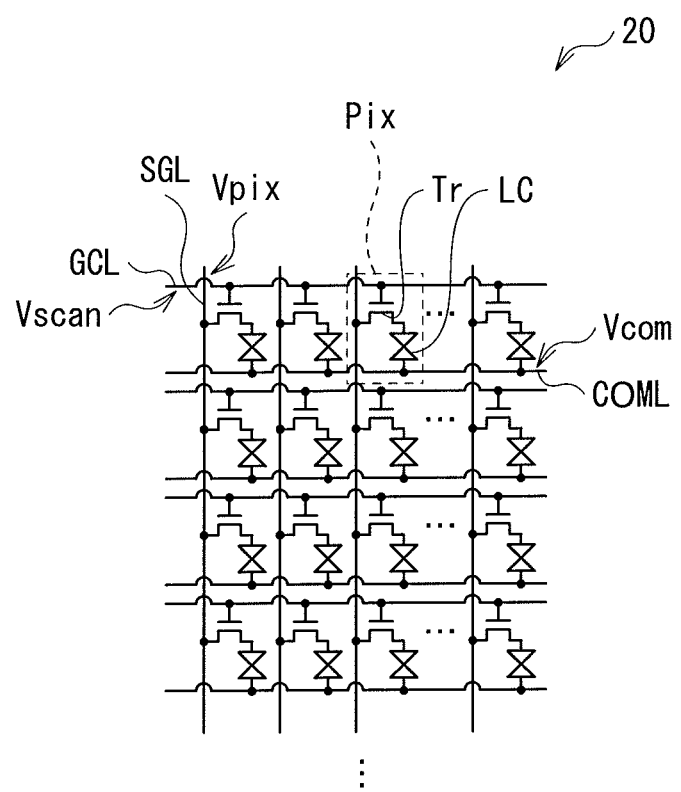
FIG. 6 is a circuit diagram illustrating a pixel array of the touch detection function display unit illustrated in FIG. 4.

FIG. 6 illustrates an example of a pixel configuration in the liquid crystal display unit 20. The liquid crystal display unit 20 includes the plurality of pixels Pix which are arranged in matrix. The pixel Pix includes the TFT element Tr and a liquid crystal element LC. The TFT element Tr is configured by a thin-film transistor, and in this embodiment is configured by a TFT of an n-channel metal-oxide semiconductor (MOS), although it is not limited thereto. The TFT element Tr has a source connected to the pixel signal line SGL, the gate connected to the scan signal line GCL, and a drain connected to a first end of the liquid crystal element LC. The liquid crystal element LC has the first end connected to the drain of the TFT element TR, and a second end connected to the drive electrode COML.

The pixel Pix is connected mutually, through the scan signal line GCL, to other pixels Pix that belong to the same row in the liquid crystal display unit 20. The scan signal line GCL is connected to the gate driver 12, and is supplied with the scan signal Vscan by the gate driver 12. The pixel Pix is connected mutually, through the pixel signal line SGL, to other pixels Pix that belong to the same column in the liquid crystal display unit 20. The pixel signal line SGL is connected to the source driver 13, and is supplied with the pixel signal Vpix by the source driver 13.

The pixel Pix is further connected mutually, through the drive electrode COML, to other pixels Pix that belong to the same row in the liquid crystal display unit 20. The drive electrode COML is connected to the drive electrode driver 14, and is supplied with the drive signal Vcom by the drive electrode driver 14. In other words, in this embodiment, the plurality of pixels Pix that belong to the same one row share one drive electrode COML. In an alternative embodiment, the plurality of pixels Pix belonging to the plurality of rows (two rows in FIG. 2, although it is not limited thereto) may share one drive electrode COML.

With this configuration, in the liquid crystal display unit 20, the gate driver 12 so drives the scan signal lines GCL as to perform line-sequential scanning of the scan signal lines GCL in a time-divisional fashion to thereby allow one display horizontal line to be selected sequentially, and the source driver 13 supplies the pixel signals Vpix to the pixels Pix which belong to that one display horizontal line, thus allowing the display to be performed one display horizontal line at a time. In performing this display operation, the drive electrode driver 14 applies a common voltage (zero volts in this embodiment) to all of the drive electrodes COML.

Figure 7:
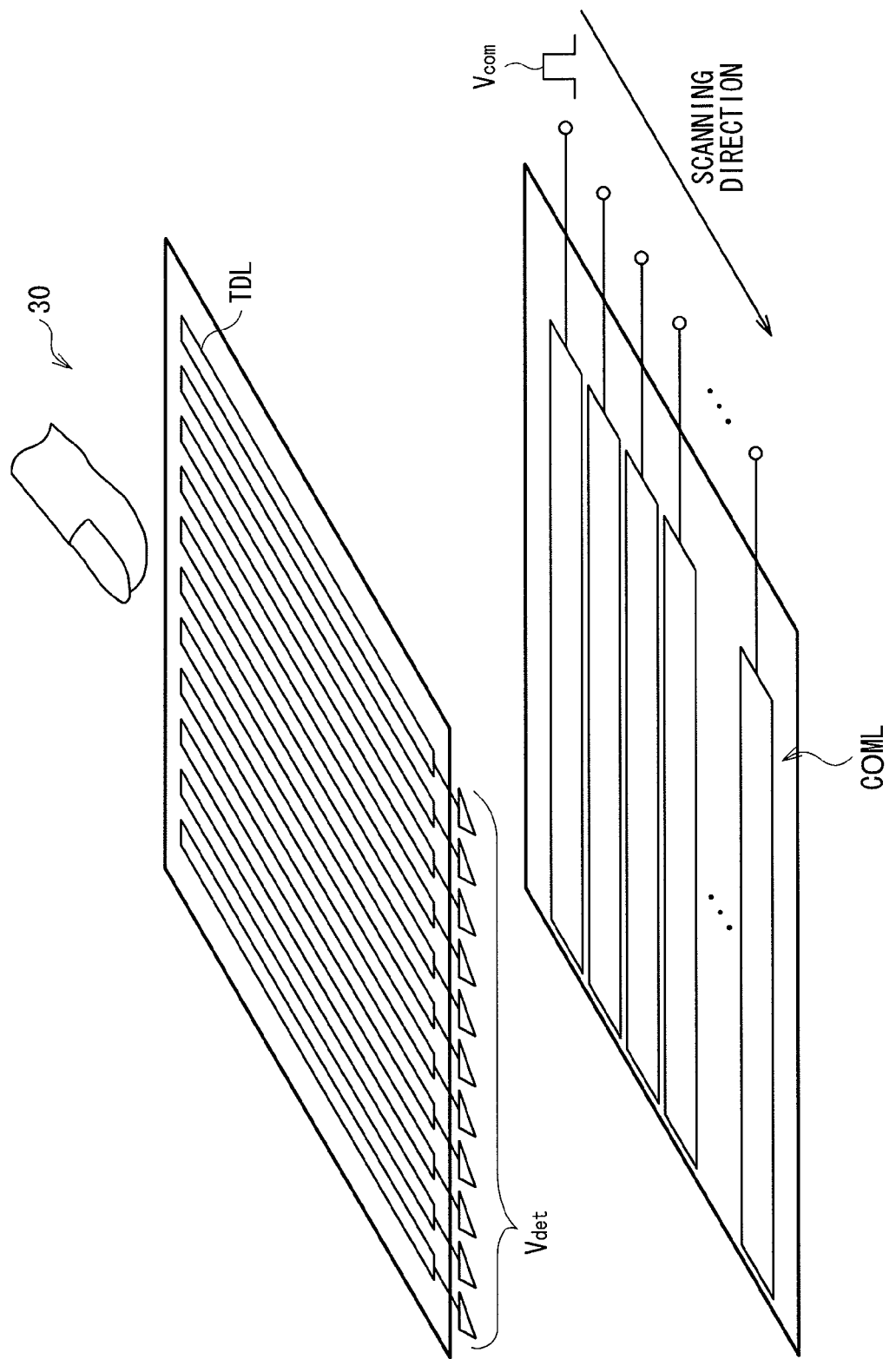
FIG. 7 is a perspective view illustrating a configuration example of a drive electrode and that of a touch detection electrode of the touch detection function display unit illustrated in FIG. 4.

FIG. 7 is a perspective view illustrating a configuration example of the touch detection unit 30. The touch detection unit 30 is configured by the drive electrodes COML and the touch detection electrodes TDL, both of which are provided in the opposed substrate 3. The drive electrodes COML configure a plurality of stripe-shaped electrode patterns extending, for example, in a horizontal direction in the figure. In the touch detection period, the respective electrode patterns are sequentially supplied with the drive signals Vcom by the drive electrode driver 14, and are driven with the line-sequential scanning in a time-divisional fashion as will be described later in detail. The touch detection electrodes TDL configure k-number of stripe-shaped electrode patterns ("k" is a natural number) extending in a direction orthogonal to the extending direction of the drive electrodes COML. Each of the electrode patterns of the touch detection electrodes TDL is connected to an input of the touch detection circuit 40. The electrode patterns which intersect one another by the drive electrode COML and the touch detection electrode TDL form an electrostatic capacitance at a location at which the drive electrode COML and the touch detection electrode TDL intersect each other.

With this configuration, in the touch detection period, the drive electrode driver 14 so drives the drive electrodes COML as to perform line-sequential scanning of the drive electrodes COML in a time-divisional fashion to thereby allow one detection horizontal line to be selected sequentially, and the touch detection signals Vdet are outputted from the touch detection electrodes TDL, thus allowing the touch detection for the one detection horizontal line to be performed, in the touch detection unit 30. In other words, the drive electrode COML corresponds to the drive electrode E1 and the touch detection electrode TDL corresponds to the touch detection electrode E2 in the basic principle of the touch detection described above with reference to FIGS. 1 to 3, and the touch detection unit 30 detects the touch or the proximity in accordance with the basic principle. Hence, the touch detection signal Vdet is higher in voltage when there is no touch or proximity, and is lower in voltage when there is touch or proximity. As illustrated in FIG. 7, the electrode patterns, which intersect one another, configure the electrostatic capacitance type touch sensor in a matrix form. Thus, the scanning throughout the entire touch detection plane of the touch detection unit 30 makes it possible to detect a position at which the contact or the proximity of the external proximity object has occurred.

Touch Detection Circuit 40

A configuration example of the touch detection circuit 40 will now be described in detail.

Figure 8:
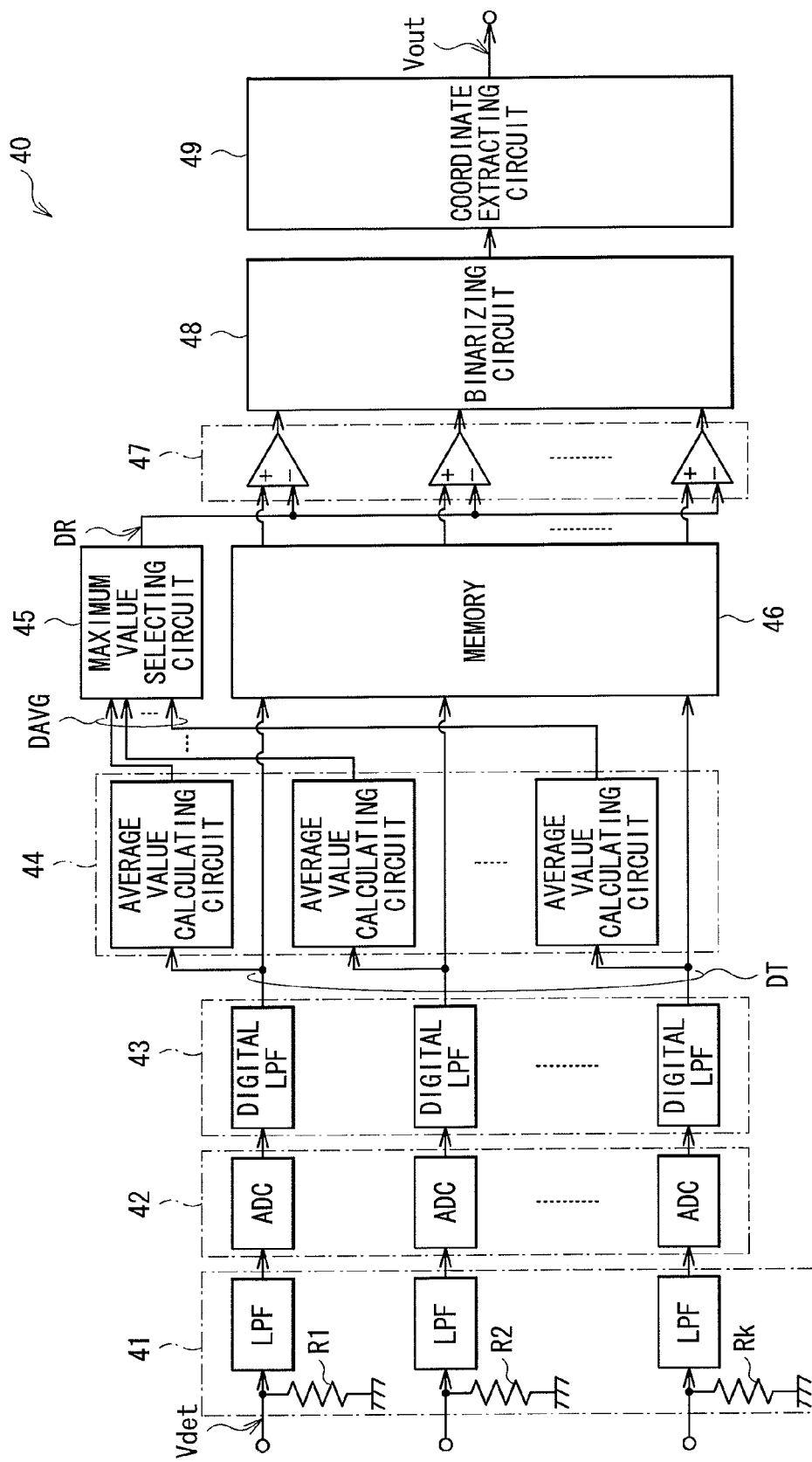
FIG. 8 is a circuit diagram illustrating a configuration example of a touch detection circuit illustrated in FIG. 4.

FIG. 8 illustrates an example of a circuit configuration of the touch detection circuit 40. The touch detection circuit 40 is provided with a LPF (Low Pass Filter) section 41, an ADC (Analog-to-Digital Converter) section 42, a digital LPF section 43, an average value calculating section 44, a maximum value selecting circuit 45, a memory 46, a subtracting section 47, a binarizing circuit 48, and a coordinate extracting circuit 49.

The LPF section 41 serves as a low-pass analog filter which removes a high-frequency component from each of the touch detection signals Vdet supplied from the k-number of touch detection electrodes TDL, and outputs the touch detection signals Vdet subjected to the high-frequency component removal. In one embodiment, the LPF section 41 may have a function of amplifying the signal inputted thereto. Further, registers R1 to Rk for applying a DC potential (e.g., zero volts) are each connected or inserted between an input terminal and the ground. In one embodiment, switches may be provided instead of the resistors R1 to Rk, and the switches may be turned ON during a predetermined time to apply the DC potential (e.g., zero volts). The ADC section 42 is a circuit which converts the analog signals supplied from the LPF section 41 into digital signals. The digital LPF section 43 utilizes time-series data of the digital signals supplied respectively from the ADC section 42 to perform computing of a low-pass filter, and outputs thus-obtained results as touch detection data DT.

The average value calculating section 44 is an arithmetic circuit which computes an average value, in a time period it takes to perform the scanning of the touch detection throughout the entire touch detection plane (i.e., one detection frame period TF), of each of the touch detection data DT supplied from the digital LPF section 43, and outputs thus-obtained average values as average data DAVG. The maximum value selecting circuit 45 is an arithmetic circuit which selects, for each one detection frame, the maximum one of the average data DAVG supplied respectively from the average value calculating section 44, and outputs the selected maximum average data DAVG as reference data DR. The memory 46 holds and accumulates therein the touch detection data DT, of the one detection frame, that are supplied respectively from the digital LPF section 43.

The subtracting section 47 is an arithmetic circuit which subtracts the reference data DR, supplied from the maximum value selecting circuit 45, from each of the touch detection data DT supplied from the memory 46. The binarizing circuit 48 is an arithmetic circuit which compares each data supplied from the subtracting section 47 with a predetermined threshold value to perform binarization. The coordinate extracting circuit 49 extracts, based on data supplied from the binarizing circuit 48, the coordinate at which the touch or the proximity is made or occurred in the touch detection plane of the touch detection unit 30.

In this embodiment, the LPF section 41, the ADC section 42, the digital LPF section 43, the average value calculating section 44, and the subtracting section 47 each perform parallel processing of the plurality of touch detection signals Vdet, although it is not limited thereto. In an alternative embodiment, a part of or all of those sections may perform serial processing of signals such as the time-division multiplexed touch detection signals Vdet, for example.

With the configuration described in the foregoing, the average value calculating section 44 and the maximum value selecting circuit 45 extracts, when the touch detection signals Vdet containing a touch component and an external noise component are supplied to the touch detection circuit 40, the external noise component (the reference data DR), and the subtracting section 47 subtracts the extracted external noise component from the touch detection data DT, to thereby obtain the touch component, in the touch detection circuit 40. This will be described later in greater detail.

In one embodiment, the touch detection electrode TDL is a specific example of a "detection electrode". The touch detection signal Vdet is a specific example of a "detection signal". The reference data DR is a specific example of a "reference". The LPF section 41, the ADC section 42, the digital LPF section 43, the average value calculating section 44, the maximum value selecting circuit 45, the memory 46, and the subtracting section 47 are a specific example of a "signal correction section". The binarizing circuit 48 and the coordinate extracting circuit 49 are a specific example of a "detecting section".

Operation and Function

An operation and a function of the display device having the touch detection function 1 will now be described.

Outline of Overall Operation

The control section 11 supplies, based on the picture signal Vdisp supplied from the outside, the control signal to each of the gate driver 12, the source driver 13, the drive electrode driver 14, and the touch detection circuit 40, and controls the gate driver 12, the source driver 13, the drive electrode driver 14, and the touch detection circuit 40 so that they operate in a mutually-synchronized fashion. The gate driver 12 supplies, based on the control signal supplied from the control section 11, the scan signals Vscan to the liquid crystal display unit 20, to sequentially select one display horizontal line subjected to the display drive. The source driver 13 supplies, based on the control signal supplied from the control section 11, the pixel signal Vpix to each of the pixels Pix structuring the one display horizontal line selected by the gate driver 12. The drive electrode driver 14, based on the control signal supplied from the control section 11, applies the display drive signals (e.g., the DC signal of zero volts) serving as the drive signals Vcom to all of the drive electrodes COML during the display period, whereas the drive electrode driver 14 sequentially applies the pulsed touch drive signals serving as the drive signals Vcom to the drive electrodes COML to thereby sequentially select one detection horizontal line during the touch detection period. The touch detection function display unit 10 performs the display operation based on the signals supplied from the gate driver 12, the source driver 13, and the drive electrode driver 14 during the display period, and performs, during the touch detection period, the touch detection operation based on the signals supplied from the drive electrode driver 14, and outputs the touch detection signals Vdet from the touch detection electrodes TDL.

In the touch detection circuit 40, the LPF section 41 performs the high-frequency component removal on the touch detection signals Vdet supplied from the touch detection function display unit 10, and outputs the touch detection signals Vdet subjected to the high-frequency component removal. The ADC section 42 converts the analog signals supplied from the LPF section 41 into the digital signals. The digital LPF section 43 utilizes the time-series data of the digital signals supplied from the ADC section 42 to perform the computing of the low-pass filter, and outputs the thus-obtained results as the touch detection data DT. The average value calculating section 44 computes the average value in one detection frame period TF of each of the touch detection data DT supplied from the digital LPF section 43. The maximum value selecting circuit 45 selects, for each one detection frame, the maximum one of the data supplied respectively from the average value calculating section 44, and outputs the selected maximum average data DAVG as the reference data DR. The memory 46 accumulates therein the touch detection data DT for the one detection frame that are supplied from the digital LPF section 43. The subtracting section 47 subtracts the reference data DR from each of the touch detection data DT supplied from the memory 46. The binarizing circuit 48 compares each of the data supplied from the subtracting section 47 with the predetermined threshold value to perform the binarization. The coordinate extracting circuit 49 extracts, based on the data supplied from the binarizing circuit 48, the coordinate at which the touch or the proximity is made or occurred.

Example of Detailed Operation of Touch Detection Function Display Unit 10

Figure 9:
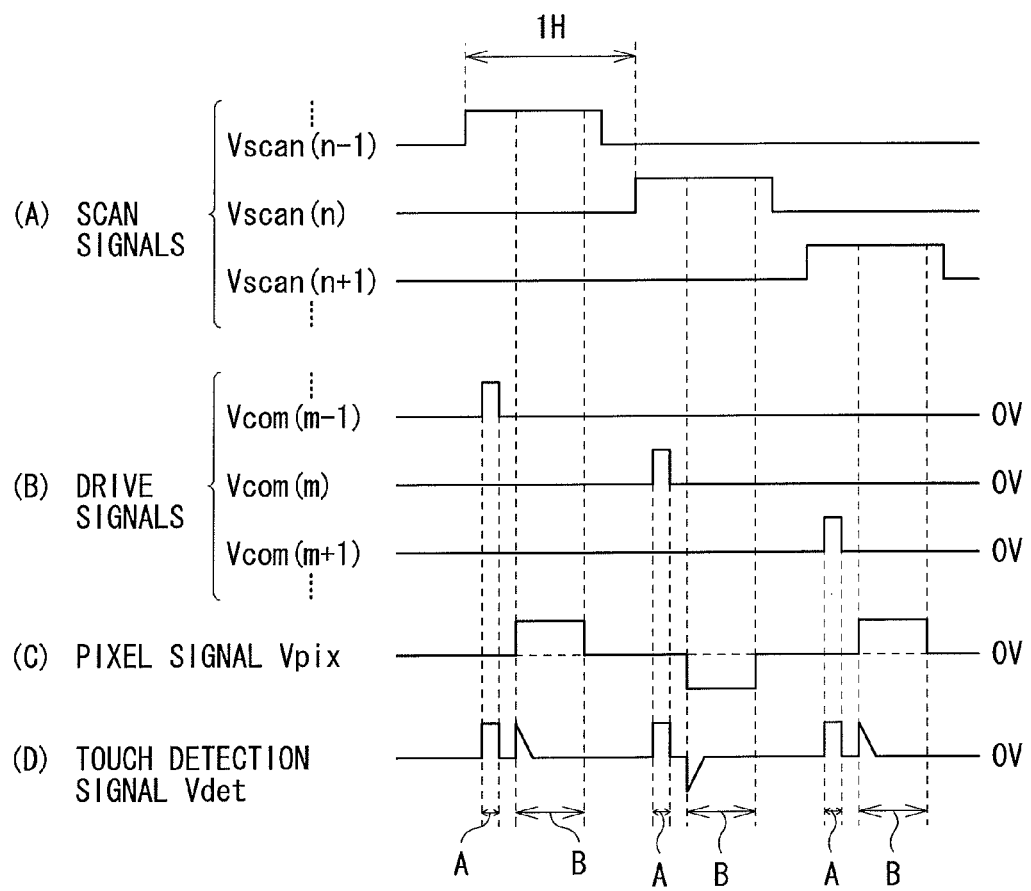
FIG. 9 is a timing waveform diagram illustrating an example of an operation of the display device having the touch detection function illustrated in FIG. 4.

FIG. 9 illustrates an example of a detailed operation of the display device having the touch detection function 1. In FIG. 9, (A) illustrates waveforms of the scan signals Vscan, (B) illustrates waveforms of the drive signals Vcom, (C) illustrates a waveform of the pixel signal Vpix, and (D) illustrates a waveform of the touch detection signal Vdet. Herein, the scan signals Vscan illustrated in (A) of FIG. 9 are those belonging to the (n−1)th row, n-th row, and (n+1)th row, which are adjacent to one another, of the scan signal lines GCL, respectively. Similarly, the drive signals Vcom illustrated in (B) of FIG. 9 are those belonging to the (m−1)th row, m-th row, and (m+1)th row, which are adjacent to one another, of the common electrodes COML, respectively.

The display device having the touch detection function 1 time-divisionally performs the touch detection operation (a touch detection period A) and the display operation (a display period B) for each one display horizontal period (1H). In the touch detection operation, the display device having the touch detection function 1 selects, for each one display horizontal period (1H), different drive electrode COML and applies the drive signal Vcom thereto to perform the scanning of the touch detection. In the following, description is given on those operations in detail.

First, the gate driver 12 applies the scan signal Vscan to the scan signal line GCL in the (N−1)th row, by which a scan signal Vscan(n−1) changes from a low level to a high level ((A) of FIG. 9). This starts one display horizontal period (1H).

Then, in the touch detection period A, the drive electrode driver 14 applies the drive signal Vcom to the drive electrode COML in the (m−1)th row, by which a drive signal Vcom(m−1) changes from a low level to a high level ((B) of FIG. 9). This drive signal Vcom(m−1) is transmitted to the touch detection electrode TDL through an electrostatic capacitance, allowing the touch detection signal Vdet to be changed ((D) of FIG. 9). Then, when the drive signal Vcom(m−1) changes from the high level to the low level ((B) of FIG. 9), the touch detection signal Vdet changes likewise ((D) of FIG. 9). The waveform of the touch detection signal Vdet in this touch detection period A corresponds to that of the touch detection signal Vdet ((A) of FIG. 3) in the basic principle of the touch detection described above. In other words, the touch detection signal Vdet is high in voltage when there is no touch or proximity, and is low in voltage when there is touch or proximity. The ADC section 42 performs an analog-to-digital conversion on the touch detection signal Vdet in this touch detection period A to perform the touch detection. Thereby, the touch detection for one detection horizontal line is performed in the display device having the touch detection function 1.

Next, in the display period B, the source driver 13 applies the pixel signal Vpix to the pixel signal line SGL ((C) of FIG. 9) to perform the display for one display horizontal line. It is to be noted that, as illustrated in (D) of FIG. 9, this change in the pixel signal Vpix may be transmitted to the touch detection electrode TDL through the electrostatic capacitance, and may in turn change the touch detection signal Vdet. However, in the display period B, the ADC section 42 may be adapted not to perform the analog-to-digital conversion, to thereby suppress an influence of the change of the pixel signal Vpix on the touch detection. When the supplying of the pixel signal Vpix by the source driver 13 has completed, the gate driver 12 then changes the scan signal Vscan(n−1) belonging to the scan signal line GCL in the (n−1)th row from the high level to the low level ((A) of FIG. 9). This ends the one display horizontal period.

Next, the gate driver 12 applies the scan signal Vscan to the scan signal line GCL in the n-th row which is different one from the previous scan signal line GCL, by which a scan signal Vscan(n) changes from a low level to a high level ((A) of FIG. 9). This starts the subsequent one display horizontal period (1H).

Then, in the touch detection period A, the drive electrode driver 14 applies the drive signal Vcom to the drive electrode COML in the (m)th row which is different one from the previous drive electrode COML ((B) of FIG. 9). A change in the touch detection signal Vdet accompanied thereby ((D) of FIG. 9) is subjected to the analog-to-digital conversion by the ADC section 42. Thereby, the touch detection for this one detection horizontal line is performed.

Next, in the display period B, the source driver 13 applies the pixel signal Vpix to the pixel signal line SGL ((C) of FIG. 9) to perform the display for one display horizontal line. It is to be noted that, in this embodiment, the display device having the touch detection function 1 performs the dot-inversion drive. Hence, the pixel signal Vpix applied by the source driver 13 is reversed in polarity as compared with that applied in the preceding one display horizontal period. The completion of this display period B ends the present one display horizontal period.

From then on, the display device having the touch detection function 1 repeats the operation described before, to thereby perform the display operation by the scanning throughout the entire display plane, and the touch detection operation by the scanning throughout the entire touch detection plane.

Example of Detailed Operation of Touch Detection Circuit 40

An operation of the touch detection circuit 40 will now be described. Herein, on the assumption that there is an external noise, description is given based on an example where the touch detection function display unit 10 outputs from the touch detection electrode TDL the touch detection signal Vdet that contains the touch component and the external noise component. In this description, the external noise component is substantially constant irrespective of the touch detection electrodes TDL as can be typically considered.

Figure 10:
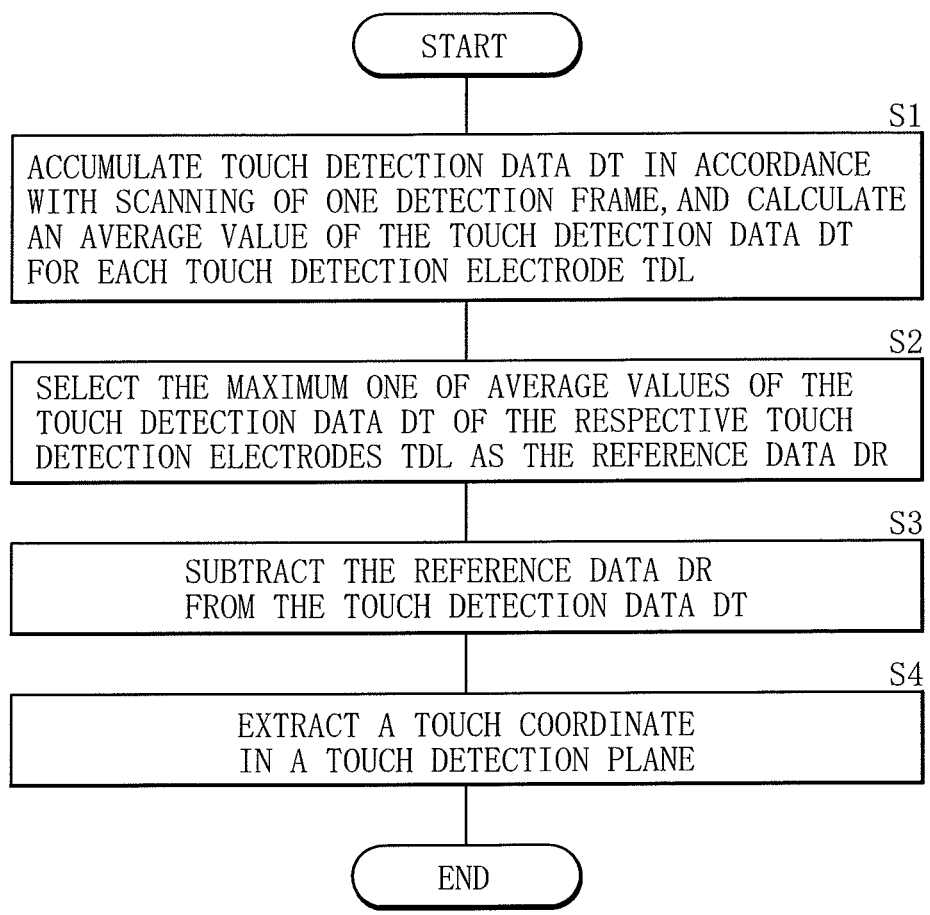
FIG. 10 is a flowchart illustrating an example of an operation of the touch detection circuit illustrated in FIG. 4.

FIG. 10 is a flowchart of the operation of the touch detection circuit 40. The touch detection circuit 40, when the touch detection signals Vdet each containing the touch component and the external noise component are inputted therein, accumulates the touch detection data DT of the one detection frame that correspond to those touch detection signals Vdet into the memory 46, and extracts, as the reference data DR, the external noise component from the touch detection data DT. Then, the touch detection circuit 40 subtracts the reference data DR from each of the touch detection data DT accumulated in the memory 46 to extract the touch component, and obtains, based on the extracted touch component, the coordinate at which the touch or the proximity is made or occurred in the touch detection plane. In the following, description is given on each step.

First, the touch detection circuit 40 accumulates the touch detection data DT in accordance with the scanning of the one detection frame, and calculates the average value of the touch detection data DT for each of the touch detection electrodes TDL (Step S1). More specifically, the LPF section 41, the ADC section 42, and the digital LPF section 43 generate, based on the touch detection signals Vdet inputted from the touch detection electrodes TDL, the touch detection data DT. Then, the memory 46 holds and accumulates therein the touch detection data DT for the one detection frame. At the same time, the average value calculating section 44 calculates the average value of the touch detection data DT in one detection frame period TF of each of the touch detection electrodes TDL, and outputs the respective thus-calculated average values as the average data DAVG. The touch detection signal Vdet belonging to the touch detection electrode TDL in which the touch is made or the proximity is occurred contains a large amount of touch component, and thus the average value of the touch detection data (the average data DAVG) becomes low in value. On the other hand, the touch detection signal Vdet belonging to the touch detection electrode TDL to which no touch is made or no proximity is occurred contains no touch component, and thus the average data DAVG becomes high in value. In other words, the average data DAVG derived from the touch detection electrode TDL in which no touch is made or no proximity is occurred corresponds to the external noise component.

Then, the maximum value selecting circuit 45 selects the average data DAVG that has the maximum value among the average data DAVG of the respective touch detection electrodes TDL obtained by the average value calculating section 44 as the reference data DR (Step S2). This is equivalent to the selection of the previously-described average data DAVG that is derived from the touch detection electrode TDL in which no touch is made or no proximity is occurred. In other words, the maximum value selecting circuit 45 selects the average data DAVG in which a magnitude (or an absolute value) of a sum of the touch component and the noise component is the smallest. That is, a time-average of the absolute value of the sum of the touch component and the noise component, both contained in the detection signal outputted from the corresponding detection electrode, is calculated for each of the detection electrodes, a smallest time-average is selected from the plurality of time-averages obtained, and a time-average of a detection signal which has brought the selected smallest time-average is used as the reference. Thereby, the reference data DR corresponds to the external noise component.

In the following, the touch detection electrode TDL associated with the reference data DR (a reference touch detection electrode) will be described.

Figure 11A:
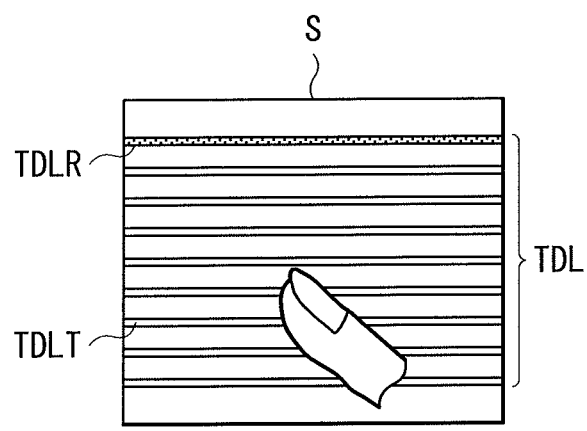
FIGS. 11A and 11B each schematically illustrate an example of an operation of a reference touch detection electrode of the touch detection function display unit illustrated in FIG. 4.
Figure 11B:
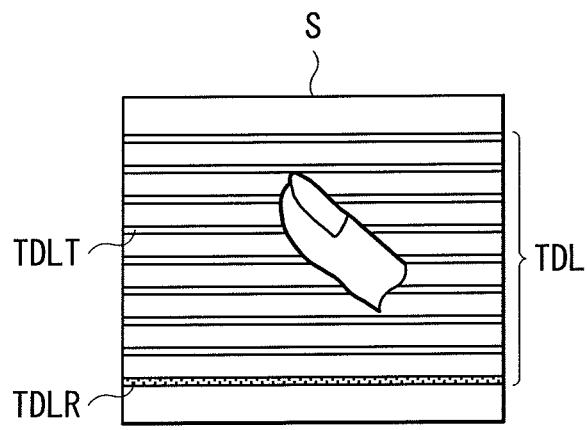

FIGS. 11A and 11B each schematically illustrate an example of an operation of the reference touch detection electrode. FIG. 11A illustrates an example where the external proximity object is located on a lower side of the touch detection plane. FIG. 11B illustrates an example where the external proximity object is located on an upper side of the touch detection plane.

For example, when the external proximity object is located on the lower side of the touch detection plane as illustrated in FIG. 11A, the touch detection signal Vdet of a touch detection electrode TDLT corresponding to a position of the external proximity object contains many touch components, whereas the touch detection signal Vdet of an uppermost touch detection electrode TDLR contains few touch components and the external noise component is dominant. In other words, the touch detection data DT associated with the touch detection electrode TDLT becomes the smallest, and the touch detection data DT associated with the touch detection electrode TDLR becomes the largest. The maximum value selecting circuit 45 selects the touch detection data DT belonging to the touch detection electrode TDLR as the reference data DR. Hence, in this example, the uppermost touch detection electrode TDLR serves as the reference touch detection electrode.

Similarly, in an example where the external proximity object is located on the upper side of the touch detection plane as illustrated in FIG. 11B, the touch detection signal Vdet of the touch detection electrode TDLT corresponding to a position of the external proximity object contains many touch components, whereas the touch detection signal Vdet of a lowermost touch detection electrode TDLR contains few touch components and the external noise component is dominant. In other words, the touch detection data DT associated with the touch detection electrode TDLT becomes the smallest, and the touch detection data DT associated with the touch detection electrode TDLR becomes the largest. The maximum value selecting circuit 45 selects the touch detection data DT belonging to the touch detection electrode TDLR as the reference data DR. Hence, in this example, the lowermost touch detection electrode TDLR serves as the reference touch detection electrode.

Then, the subtracting section 47 subtracts the reference data DR from the touch detection data DT (Step S3). More specifically, the memory 46 sequentially outputs the accumulated touch detection data DT of the one detection frame, and the subtracting section 47 subtracts the reference data DR from each of the outputted touch detection data DT. In other words, the reference data DR corresponding to the external noise component is subtracted from each of the touch detection data DT containing both the touch component and the external noise component, to thereby extract the touch component.

Then, the coordinate extracting circuit 49 extracts the touch coordinate in the touch detection plane (Step S4). More specifically, the binarizing circuit 48 first performs the binarization by comparing the respective data outputted from the subtracting section 47 with the threshold values. The coordinate extracting circuit 49 then obtains, based on the data outputted from the binarizing circuit 48, the touch coordinate in the touch detection plane of the touch detection function display unit 10. Thereby, the coordinate at which the touch or the proximity is made or occurred is obtained based on the data in which the external noise component is reduced.

This ends a flow of the operation in the touch detection circuit 40. The flow described above is performed separately for each detection frame.

A prototype of the display device having the touch detection function 1 described above was fabricated to measure a signal-to-noise (S/R) ratio thereof. The measurement of the S/R ratio was conducted in a state in which a finger as the external proximity object was located at a position separated at a predetermined distance from a part near the center of the touch detection region. The S/R ratio was 1.4 when the subtracting process of deducting the reference data from the touch detection data DT was performed, whereas the S/R ratio was 1.1 when no subtracting process was performed. Hence, it was confirmed that the performing of the subtracting process improves the S/N ratio.

Effects

According to the first embodiment, the reference data is acquired from one of the plurality of touch detection electrodes. Hence, an electrode used for a detection of the external noise is eliminated, making it possible to simplify the configuration of the touch detection unit 30. Also, what is desired in deducting the external noise component is simply to subtract the reference data DR from the touch detection data DT. Hence, it is possible to make the configuration of the touch detection circuit 40 simple.

Also, according to the embodiment, the touch detection electrode for obtaining the reference data is selected from the plurality of touch detection electrodes. Hence, it is possible to reduce the external noise component in a precise fashion irrespective of a location of the external proximity object.

Further, according to the embodiment, the average value calculating section obtains the average values of the touch detection data DT of the respective touch detection electrodes, and the touch detection electrode for obtaining the reference data is selected based on the obtained average values. Hence, even when the touch detection data DT includes an accidental or sporadic noise, an influence of such a noise is kept to the minimum by the averaging, making it possible to further ensure that the touch detection electrode for obtaining the reference data is selected.

First Modification

Figure 12:
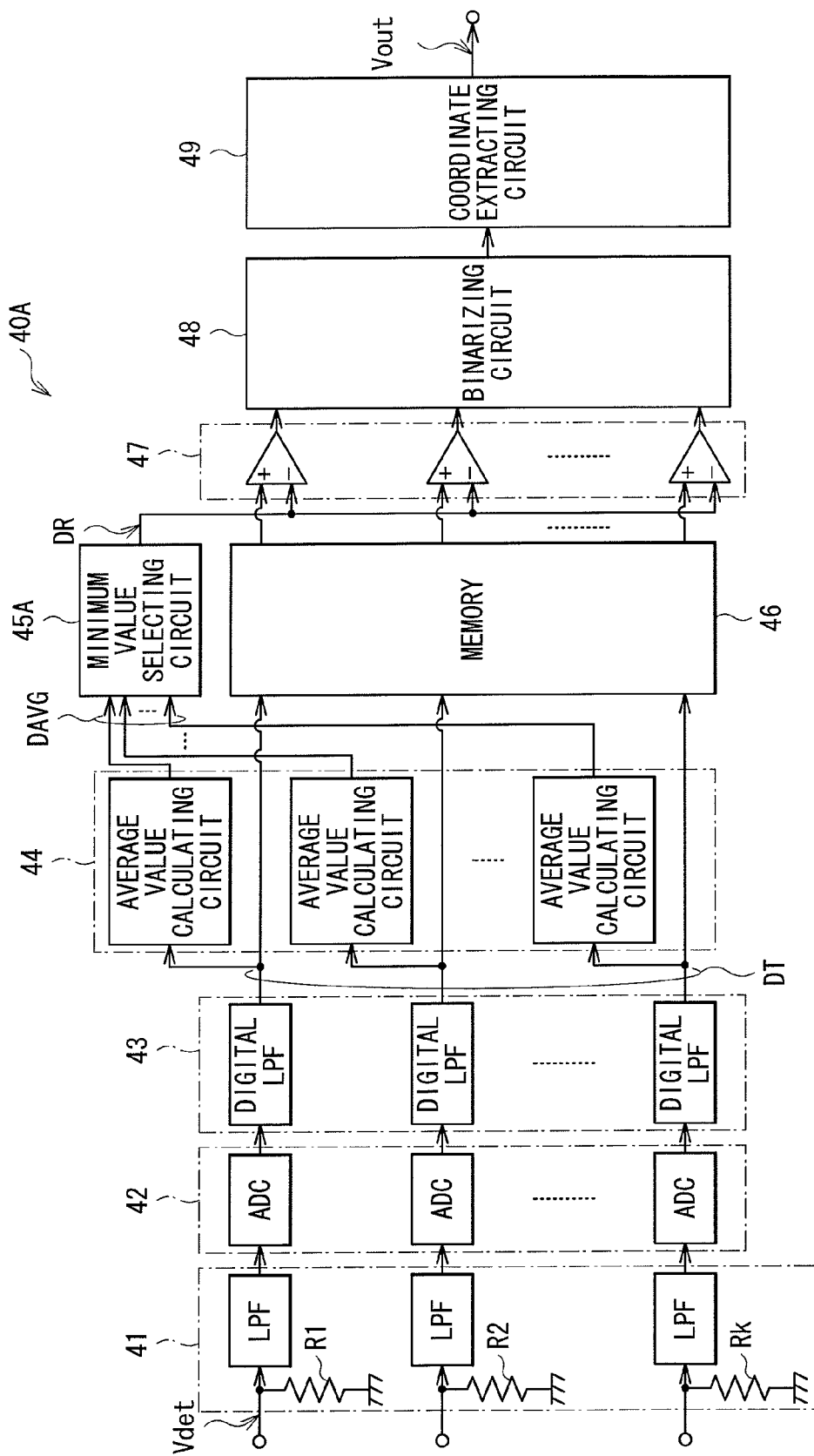
FIG. 12 is a circuit diagram illustrating a configuration example of a touch detection circuit according to a first modification of the first embodiment.

In the embodiment described above, the maximum value selecting circuit 45 that selects the maximum value of the data supplied from the average value calculating section 44 is used, although it is not limited thereto. As one embodiment, it is preferable that a minimum value selecting circuit be used in place of the maximum value selecting circuit 45, when the polarity of the touch detection signal Vdet inputted to the touch detection circuit 40 has a characteristic reverse to that of the embodiment described above (i.e., the touch detection signal Vdet is low in voltage when there is no touch or proximity, and high in voltage when there is touch or proximity), or when the LPF section 41 has a function of inverting an input voltage, for example. FIG. 12 illustrates an example of a circuit configuration of a touch detection circuit 40A that performs the touch detection based on the touch detection signal Vdet having the reversed polarity. A minimum value selecting circuit 45A is an arithmetic circuit that selects, for each one detection frame, the minimum one of the data supplied from the average value calculating section 44, and outputs the selected minimum data as the reference data DR. The reference data DR in this modification likewise corresponds to the external noise component, and the touch component is extractable by subtracting the reference data DR from the touch detection data DT in the subtracting section 47.

Second Modification

Figure 13:
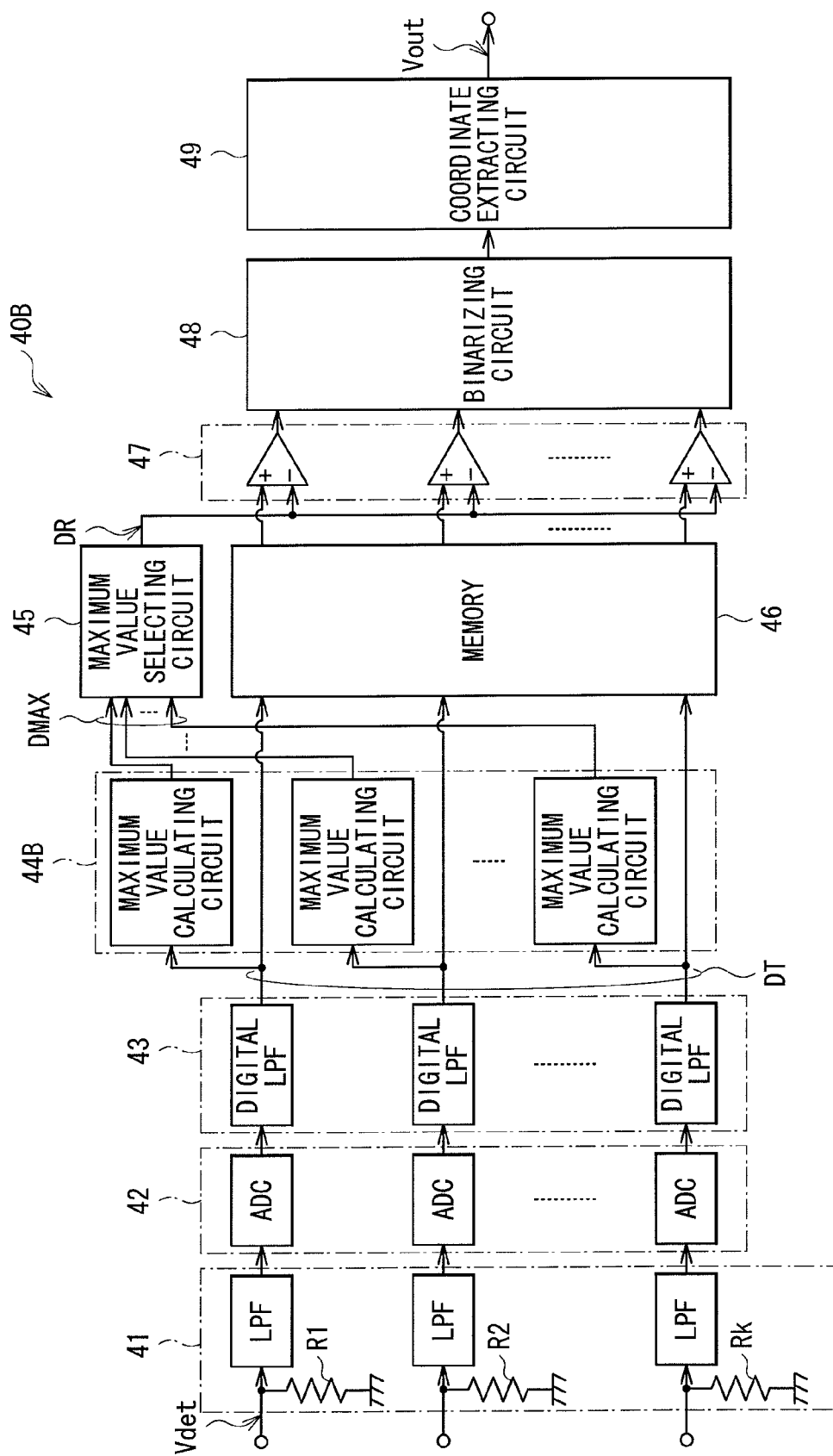
FIG. 13 is a circuit diagram illustrating a configuration example of a touch detection circuit according to a second modification of the first embodiment.

In the embodiment described above, the average value calculating section 44 obtains the average data DAVG for each of the touch detection electrodes TDL, and the touch detection electrode TDL for obtaining the reference data DR is selected based on the obtained average data DAVG, although it is not limited thereto. As an alternative embodiment, a maximum value calculating section 44B may obtain a maximum value of the touch detection data (a maximum data DMAX) of each of the touch detection electrodes TDL, and may select the touch detection electrode TDL for obtaining the reference data DR based on the obtained maximum data DMAX, as illustrated in FIG. 13, for example. In other words, the maximum value calculating section 44B obtains a minimum of a magnitude (or an absolute value) of a sum of the touch component and the noise component in a detection signal for each of the touch detection electrodes TDL, and selects one of those minimum values in which the magnitude of the sum of the touch component and the noise component is the smallest. That is, a minimum of the absolute value of the sum of the touch component and the noise component, both contained in the detection signal outputted from the corresponding detection electrode, is determined for each of the detection electrodes, a smallest minimum is selected from the plurality of minimums obtained, and a detection signal which has brought the smallest minimum is used as the reference. The maximum value calculating section 44B and the maximum value selecting circuit 45 in this modification are likewise capable of extracting the external noise component. As in the first modification described above, it is preferable that the maximum value selecting circuit 45 be changed to the minimum value selecting circuit and the maximum value calculating section 44B be changed to a minimum value calculating section in FIG. 13, when the polarity of the touch detection signal Vdet is reversed, for example.

3. SECOND EMBODIMENT

A display device having a touch detection function according to a second embodiment will now be described. The display device having the touch detection function according to the second embodiment has a configuration similar to that described in the first embodiment (illustrated in FIGS. 4, 8, etc.), except that a touch detection circuit does not employ the memory that accumulates the touch detection data DT of the one detection frame.

Figure 14:
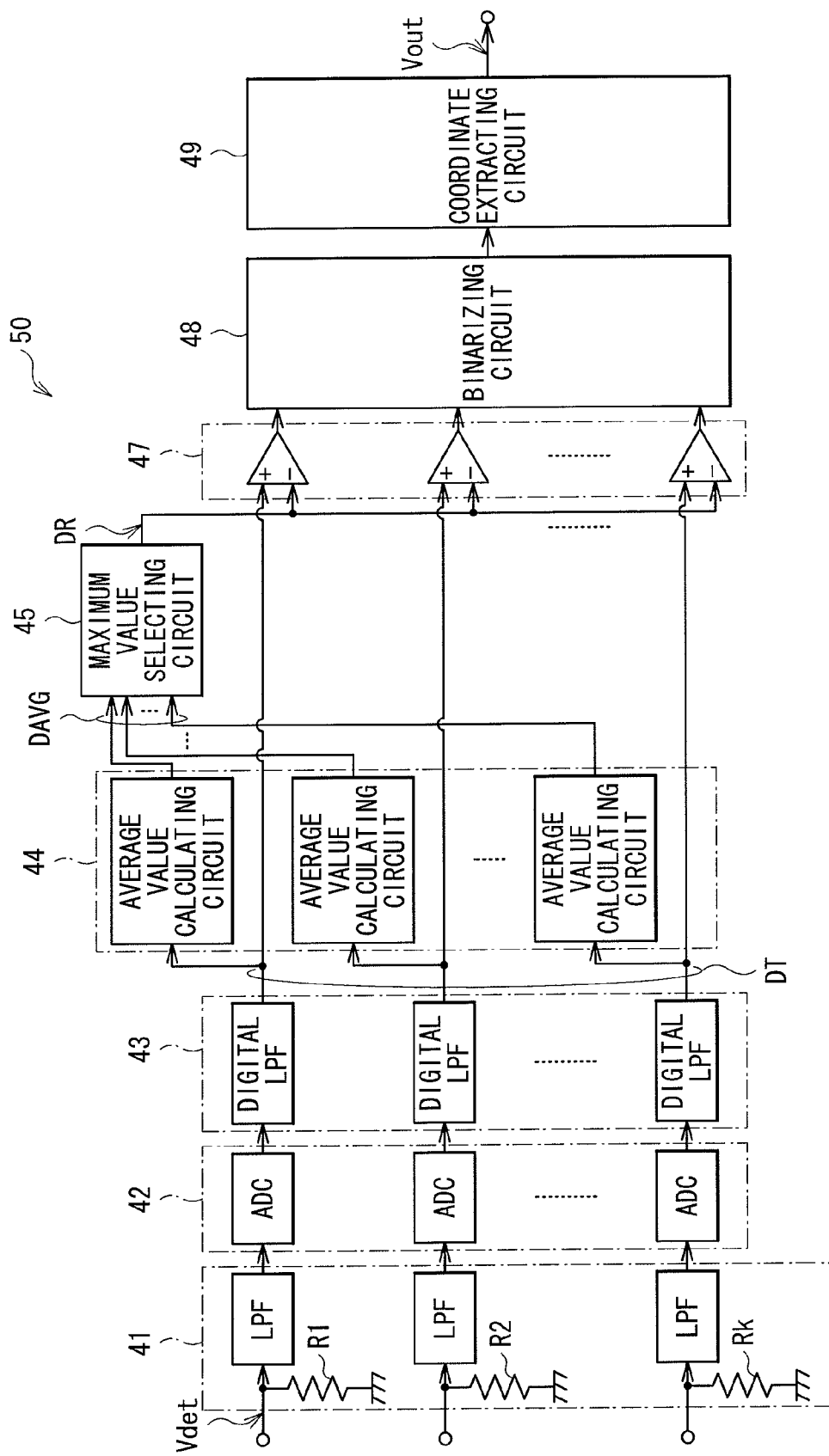
FIG. 14 is a circuit diagram illustrating a configuration example of a touch detection circuit according to a second embodiment.

FIG. 14 illustrates an example of a circuit configuration of a touch detection circuit 50 according to the second embodiment. The touch detection circuit 50 according to this embodiment has a configuration in which the memory 46 is omitted as compared with the touch detection circuit 40 (FIG. 8) according to the first embodiment described above.

In one embodiment, the LPF section 41, the ADC section 42, the digital LPF section 43, the average value calculating section 44, the maximum value selecting circuit 45, and the subtracting section 47 are a specific example of a "signal correction section".

Figure 15:
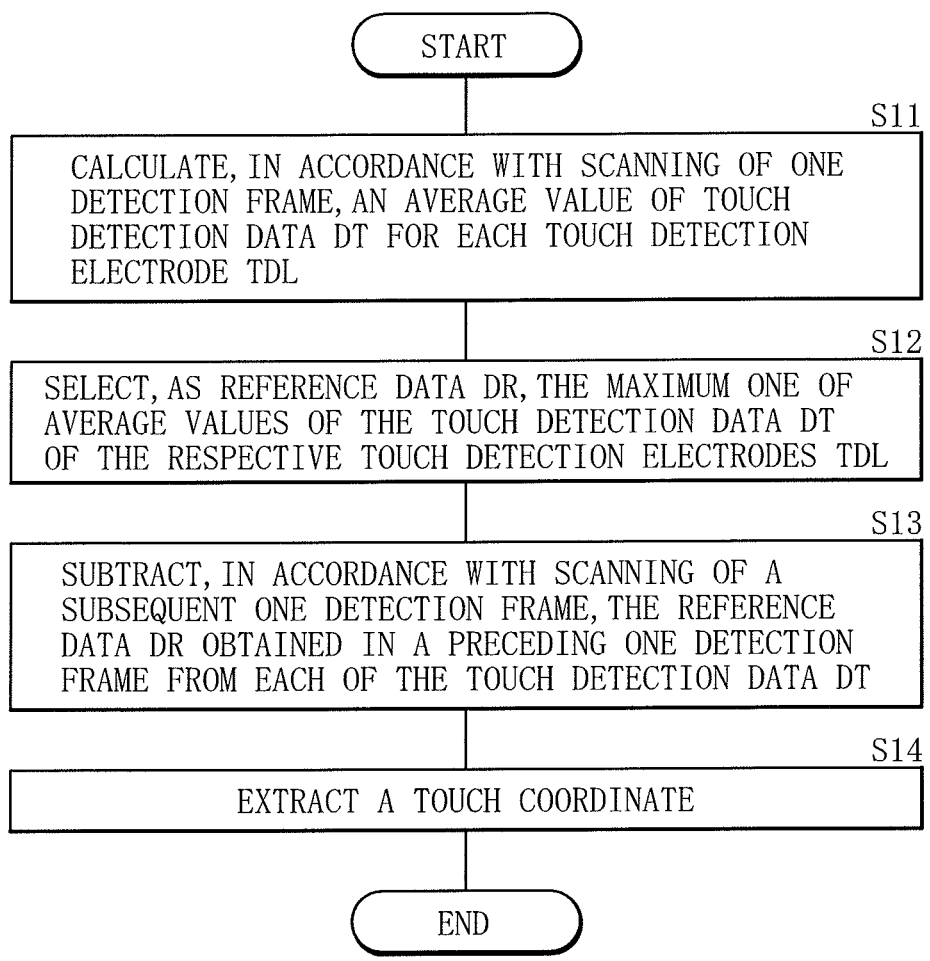
FIG. 15 is a flowchart illustrating an example of an operation of the touch detection circuit illustrated in FIG. 14.

FIG. 15 is a flowchart of an operation of the touch detection circuit 50. The touch detection circuit 50, when the touch detection signals Vdet each containing the touch component and the external noise component are inputted in accordance with the scanning of one detection frame, extracts, as the reference data DR, the external noise component from the touch detection data DT that correspond to the touch detection signals Vdet. Then, in accordance with the scanning in a subsequent one detection frame, the touch detection circuit 50 subtracts the reference data DR, extracted in the preceding one detection frame, from each of the touch detection data DT belonging to that subsequent one detection frame, to thereby obtain the touch component. Then, the touch detection circuit 50 extracts, based on the obtained touch component, the coordinate at which the touch or the proximity is made or occurred in the touch detection plane. In the following, description is given on each step.

First, the touch detection circuit 50, in accordance with the scanning of the one detection frame, calculates the average value of the touch detection data DT for each of the touch detection electrodes TDL (Step S11). More specifically, the LPF section 41, the ADC section 42, and the digital LPF section 43 generate, based on the touch detection signals Vdet inputted from the touch detection electrodes TDL, the touch detection data DT. Then, the average value calculating section 44 calculates the average value of the touch detection data DT in one detection frame period TF of each of the touch detection electrodes TDL, and outputs the respective thus-calculated average values as the average data DAVG.

Then, the maximum value selecting circuit 45 selects, as the reference data DR, the maximum one of the average values among the touch detection data DT that are obtained by the average value calculating section 44 for the respective touch detection electrodes TDL (Step S12). This step S12 is similar to the step S2 described above.

Then, the subtracting section 47 subtracts, in accordance with the scanning of the subsequent one detection frame, the reference data DR that is obtained in the preceding one detection frame from each of the touch detection data DT (Step S13). More specifically, the subtracting section 47 subtracts the reference data DR from each of the touch detection data DT. Herein, since the memory employed in the first embodiment described above is omitted in this embodiment, the touch detection data DT are supplied to the subtracting section 47 in accordance with the scanning of the one detection frame. The reference data DR, on the other hand, is obtained based on the touch detection data DT that belong to the preceding detection frame.

Then, the coordinate extracting circuit 49 extracts the touch coordinate in the touch detection plane (Step S14). This step S14 is similar to the step S4 described above. This ends a flow of the operation in the touch detection circuit 50.

According to the second embodiment described above, the memory that accumulates the touch detection data DT of one detection frame is eliminated. Hence, it is possible to allow the circuit configuration of the touch detection circuit to be simple, and to reduce the time it takes to detect the touch or the proximity. Other effects achieved by the second embodiment are similar to those according to the first embodiment.

Third Modification

As one embodiment, the configuration of the second embodiment described above may be modified by employing the minimum value selecting circuit in place of the maximum value selecting circuit 45 when, for example, the polarity of the touch detection signal Vdet is reversed, as in the first embodiment.

Fourth Modification

As one embodiment, the configuration of the second embodiment described above may be modified by employing the maximum value calculating section 44B in place of the average value calculating section 44, as in the first embodiment. The maximum value calculating section 44B and the maximum value selecting circuit 45 in this modification are likewise capable of extracting the external noise component.

4. APPLICATION EXAMPLES

Application examples of the display devices having the touch detection function according to the embodiments and the modifications will now be described with reference to FIGS. 16 to 20G. Each of the display devices having the touch detection function according to the embodiments and the modifications is applicable to any electronic unit in any field. The electronic unit may be, for example but not limited to, a television device, a digital camera, a computer including a desk-top personal computer and a laptop personal computer, a portable terminal device including a cellular phone, a video camera, or any other suitable devices. In other words, the display devices having the touch detection function according to the embodiments and the modifications are applicable to electronic units in all of fields, which display, as an image or a video image, a video signal inputted from the outside or generated internally.

First Application Example

Figure 16:
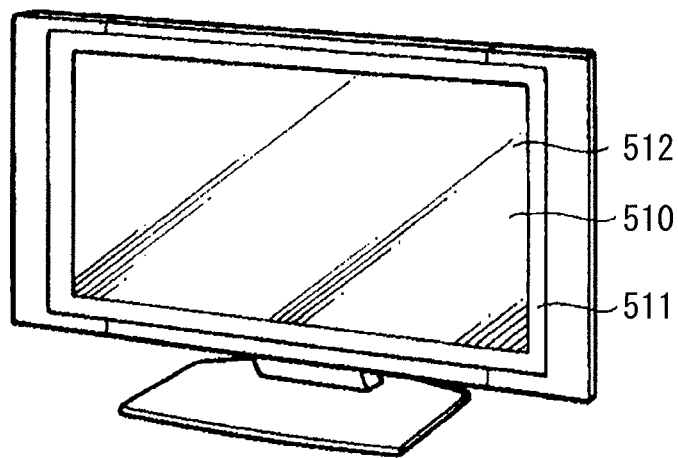
FIG. 16 is a perspective view illustrating an external configuration of a first application example to which the display device having the touch detection function according to any one of the embodiments and the modifications is applied.

FIG. 16 illustrates an external appearance of a television device to which the display device having the touch detection function according to any one of the embodiments and the modifications described above is applied. The television device is provided with an image display screen unit 510 including a front panel 511 and a filter glass 512, for example. The image display screen unit 510 includes the display device having the touch detection function according to any one of the embodiments and the modifications described above.

Second Application Example

Figure 17A:
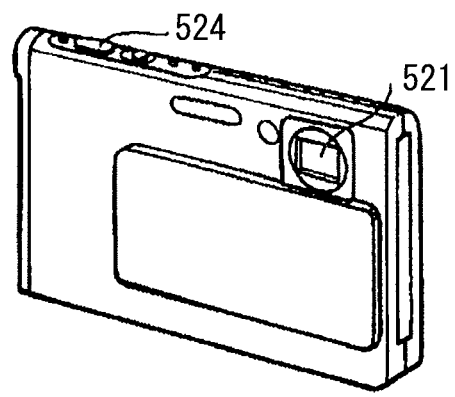
FIGS. 17A and 17B are perspective views each illustrating an external configuration of a second application example.
Figure 17B:
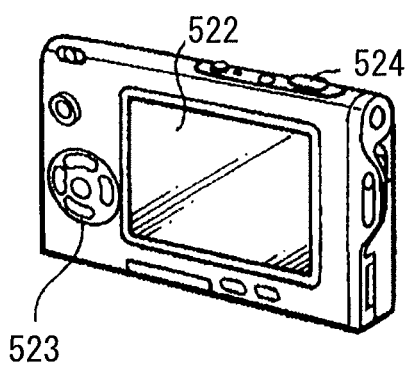

FIGS. 17A and 17B each illustrate an external appearance of a digital camera to which the display device having the touch detection function according to any one of the embodiments and the modifications described above is applied. The digital camera is provided with a light emitting unit 521 for flash, a display unit 522, a menu switch section 523, and a shutter-release button 524, for example. The display unit 522 includes the display device having the touch detection function according to any one of the embodiments and the modifications described above.

Third Application Example

Figure 18:
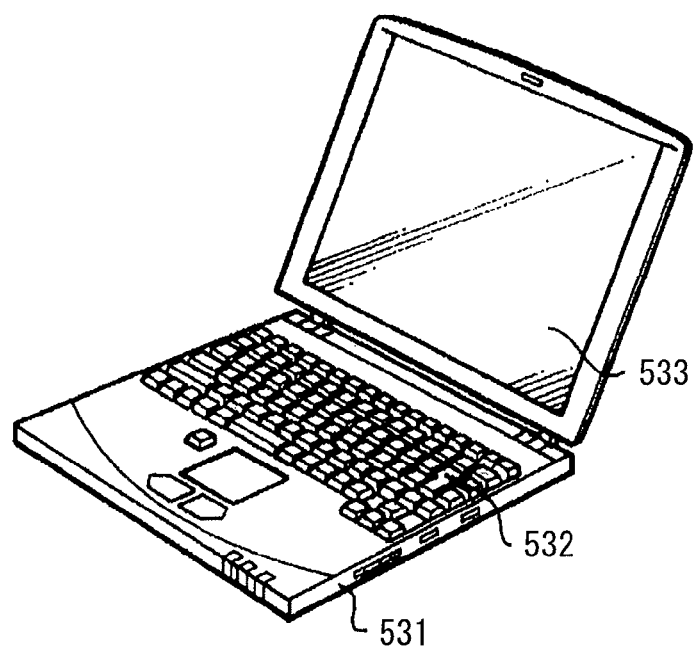
FIG. 18 is a perspective view illustrating an external configuration of a third application example.

FIG. 18 illustrates an external appearance of laptop personal computer to which the display device having the touch detection function according to any one of the embodiments and the modifications described above is applied. The laptop personal computer is provided with a body 531, a keyboard 532 for input-manipulation of characters and the like, and a display unit 533 for displaying an image, for example. The display unit 533 includes the display device having the touch detection function according to any one of the embodiments and the modifications described above.

Fourth Application Example

Figure 19:
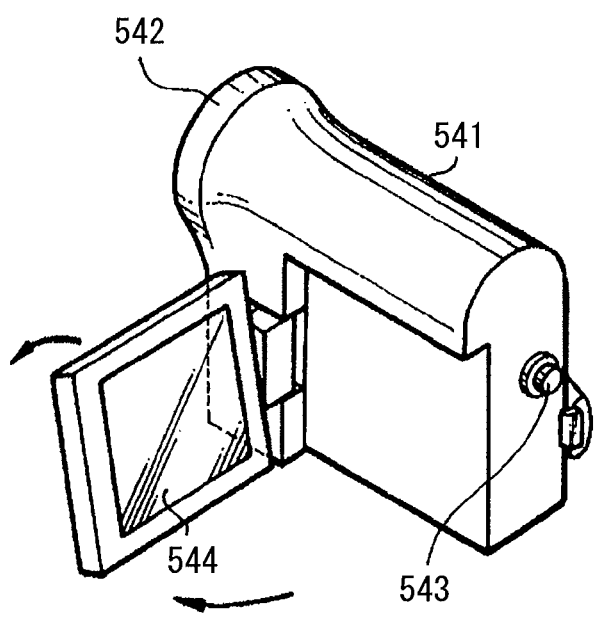
FIG. 19 is a perspective view illustrating an external configuration of a fourth application example.
Figure 20:
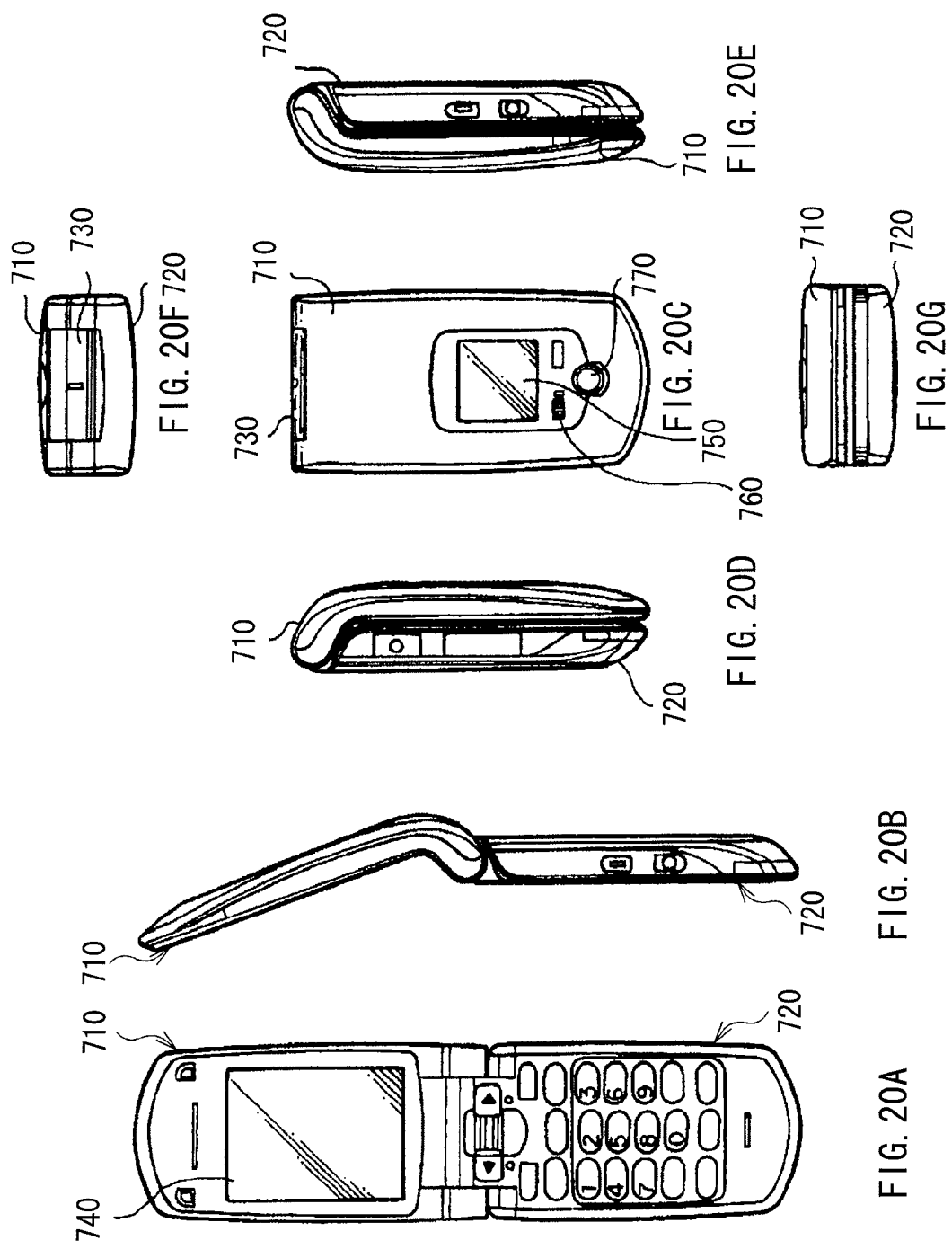
FIG. 20A is a front view in an open state.
FIG. 20B is a side view in the open state.
FIG. 20C is a front view in a closed state.
FIG. 20D is a left side view.
FIG. 20E is a right side view.
FIG. 20F is a top view.
FIG. 20G is a bottom view, each illustrating an external configuration of a fifth application example.

FIG. 19 illustrates an external appearance of a video camera to which the display device having the touch detection function according to any one of the embodiments and the modifications described above is applied. The video camera is provided with a body 541, a lens 542 provided in a front face of the body 541 for picking-up an image of an object, a shooting start/stop switch 543, and a display unit 544, for example. The display unit 544 includes the display device having the touch detection function according to any one of the embodiments and the modifications described above.

Fifth Application Example

FIGS. 20A to 20G each illustrate an external appearance of a cellular phone to which the display device having the touch detection function according to any one of the embodiments and the modifications described above is applied. The cellular phone couples an upper casing 710 and a lower casing 720 through a coupling part (or a hinge) 730, and is provided with a display 740, a sub-display 750, a picture light 760, and a camera 770, for example. The display 740 or the sub-display 750 includes the display device having the touch detection function according to any one of the embodiments and the modifications described above.

Although the application has been described in the foregoing by way of example with reference to the embodiments, the modifications, and the application examples to the electronic units, the application is not limited thereto but may be modified in a wide variety of ways.

For example, in the embodiments described above, the average value calculating section obtains the average values of the touch detection data DT (i.e., obtains the average data DAVG), and the maximum value selecting circuit selects the maximum value from those average data DAVG to generate the reference data DR, although it is not limited thereto. In an alternative embodiment, the average value calculating section may perform the addition only, and the maximum value selecting circuit may perform the division after selecting the maximum value to generate the reference data DR, for example.

Also, as one embodiment, the subtracting section 47 may subtract the reference data DR from the touch detection data DT when the external proximity object is away from the touch detection plane (i.e., a proximal state), and may output the touch detection data DT directly or as they are when the external proximity object touches the touch detection plane (i.e., a contact state). This allows it to operate to reduce the external noise only when the external proximity object is in the proximity state in a case where, for example, the external noise becomes problematic in the proximity state.

Also, in the embodiments described above, the drive electrodes COML are sequentially scanned by selecting those drive electrodes COML one by one, although it is not limited thereto. In an alternative embodiment, the plurality of drive electrodes COML may be selected at a time to perform the sequential scanning thereof.

Also, in the embodiments described above, the dot-inversion drive, in which the polarity of the pixel signal is inverted for each dot, is employed as a display drive scheme of the liquid crystal display unit, although it is not limited thereto. In an alternative embodiment, the display drive scheme may be a so-called line inversion drive in which the polarities of the pixel signals are inverted for each line, or may be a so-called frame inversion drive in which the polarities of the pixel signals are inverted for each frame.

Also, in the embodiments described above, the display drive signal is the direct current signal having the voltage of zero volts, although it is not limited thereto. In an alternative embodiment, the display drive signal may be the direct current signal having other voltage, or may be an alternating current signal. In the embodiment where the display drive signal is the alternating current signal, the liquid crystal display unit is driven based on a so-called alternating current drive.

Also, in the embodiments described above, the display period B is provided after the touch detection period A in one display horizontal period (1H), although it is not limited thereto. In an alternative embodiment, the touch detection period A may be provided after the display period B in one display horizontal period (1H).

Figure 21:
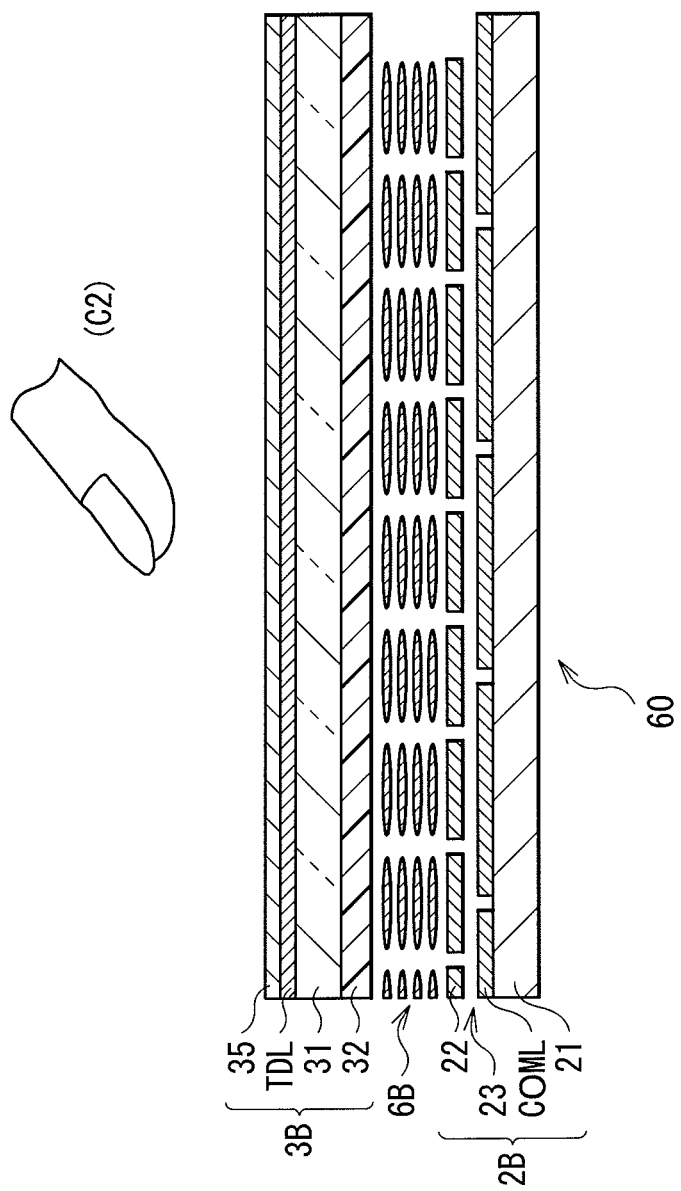
FIG. 21 is a cross-sectional view illustrating a schematic cross-sectional configuration of a touch detection function display unit according to a modification of each of the embodiments and the modifications.

Also, in the embodiments described above, the touch detection function display unit 10 has the configuration in which the liquid crystal display device 20 including the liquid crystal in any of the various modes such as the TN mode, the VA mode, and the ECB mode and the touch detection unit 30 are integrated. In an alternative embodiment, the liquid crystal display unit including the liquid crystal in a transverse electric mode such as a FFS (Fringe Field Switching) mode and an IPS (In-Plane Switching) mode and the touch detection unit may be integrated. In the embodiment where the liquid crystal in the transverse electric mode is employed, a touch detection function display unit 60 may be configured as illustrated in FIG. 21. FIG. 21 illustrates an example of a cross-sectional configuration in a major part of the touch detection function display unit 60. Referring to FIG. 21, a liquid crystal layer 6B is sandwiched between a pixel substrate 2B and an opposed substrate 3B. Since names, functions, etc. of other elements are the same as those in the embodiment described with reference to FIG. 5, those elements will not be described in detail. Unlike the embodiment of FIG. 5, the drive electrodes COML in this embodiment, which are shared for both the displaying and the touch detection, are formed immediately above the TFT substrate 21, and structure a part of the pixel substrate 2B. The pixel electrodes 22 are arranged above the drive electrodes COML with an insulating layer 23 in between. In this embodiment, all of dielectrics, including the liquid crystal layer 6B as well, between the drive electrodes COML and the touch detection electrodes TDL contribute to the formation of the electrostatic capacitance C1.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A display device having a touch detection function, the display device comprising:
   a display section performing display based on an image signal;
   a plurality of drive electrodes arranged side-by-side and extending in a direction;
   a plurality of detection electrodes arranged side-by-side, extending to intersect the drive electrodes, allowing an electrostatic capacitance to be formed at each of intersections of the drive electrodes and the detection electrodes, and each outputting a detection signal in response to driving of each of the drive electrodes;
   a signal correction section correcting the detection signals outputted from the detection electrodes, through determining a reference based on the detection signals, and through subtracting the determined reference from each of the detection signals; and
   a detecting section detecting an external proximity object based on corrected detection signals provided from the signal correction section,
   wherein the drive electrodes function as a plurality of display horizontal lines for the display section by being supplied with a display drive signal, and function as a plurality of detection horizontal lines for detecting the external proximity object by being supplied with a touch detection signal for generating the detection signal, and touch detection is performed in each predetermined period, and
   a touch detection period in which the touch detection is performed by being supplied with the touch drive signal and a display period in which display is performed by being supplied with the display drive signal are not overlapped with each other,
   wherein the predetermined period is shorter than one frame period that includes a plurality of touch detection periods and a plurality of display periods, and the display is performed by using one drive electrode in each display period, and the touch detection is performed by using one drive electrode in each touch detection period,
   wherein the touch detection period and the display period are alternately repeated in the one frame period such that scanning of the touch detection is performed throughout an entire touch detection plane, and
   wherein the signal correction section corrects the detection signals based on the detection signals obtained in the one frame period.

2. The display device having a touch detection function according to claim 1, further comprising
   a drive electrode driver supplying the display drive signal and the touch drive-signal to the drive electrodes,
   wherein the drive electrode driver sequentially selects one of the drive electrodes as a target being supplied with the touch drive signal when detecting the external proximity object by the plurality of detection horizontal lines.

3. The display device having a touch detection function according to claim 1, wherein the signal correction section calculates, for each of the detection electrodes, a time-average of absolute value of a sum of a touch component and a noise component both contained in the detection signal outputted from the corresponding detection electrode, selects a smallest time-average from the plurality of time-averages obtained, and uses, as the reference, a time-average of a detection signal which has brought the selected smallest time-average.

4. The display device having a touch detection function according to claim 1, wherein the signal correction section determines, for each of the detection electrodes, a minimum of absolute value of a sum of a touch component and a noise component both contained in the detection signal outputted from the corresponding detection electrode, selects a smallest minimum from the plurality of minimums obtained, and uses, as the reference, a detection signal which has brought the smallest minimum.

5. The display device having a touch detection function according to claim 1, wherein the signal correction section subtracts the current reference from each of the current detection signals, the current reference being determined from the current detection frame, the current detection signals being obtained from the respective detection electrodes in the current detection frame.

6. The display device having a touch detection function according to claim 5, wherein the signal correction section temporarily holds the current detection signals obtained from the respective detection electrodes.

7. The display device having a touch detection function according to claim 1, wherein the signal correction section subtracts the preceding reference from each of the current detection signals, the preceding reference being determined from the preceding detection frame, the current detection signals being obtained from the respective detection electrodes in the current detection frame.

8. The display device having a touch detection function according to claim 1, wherein in the touch detection period, the respective drive electrodes are sequentially supplied with the touch detection signal, and when any one of the drive electrodes is supplied with the touch drive signal, the other drive electrodes are not supplied with the touch drive signal and the display drive signal.

9. The display device having a touch detection function according to claim 1, wherein a touch detection by one detection horizontal line using one drive electrode, and a display by pixels corresponding to one display horizontal line using the one drive electrode that is used as the one detection horizontal line are performed for each of the drive electrodes sequentially.

10. The display device having a touch detection function according to claim 1, wherein the predetermined period corresponds to a horizontal period.

\* \* \* \* \*